US012751351B2

(12) United States Patent
Jackson et al.

(10) Patent No.: US 12,751,351 B2
(45) Date of Patent: Oct. 6, 2026

(54) CONVECTION INTERACTIONS TO ALLOW FAST HIGHER EFFICACITY IRRADIATION PROCESSES FOR REDUCING VIABILITY OF WEED SEEDS

(71) Applicants: Jonathan A Jackson, Dayton, OH (US); Patrick A Jackson, Xenia, OH (US); Mark J Elting, Lexington, VA (US)

(72) Inventors: Jonathan A Jackson, Dayton, OH (US); Patrick A Jackson, Xenia, OH (US); Mark J Elting, Lexington, VA (US)

(73) Assignee: GLOBAL NEIGHBOR INC, Dayton, OH (US)

( * ) Notice: Subject to any disclaimer, the term of this patent is extended or adjusted under 35 U.S.C. 154(b) by 365 days.

(21) Appl. No.: 18/652,234

(22) Filed: May 1, 2024

(65) Prior Publication Data

US 2025/0338788 A1 Nov. 6, 2025

(51) Int. Cl.
*A01C 1/00* (2006.01)
*A01C 1/02* (2006.01)

(52) U.S. Cl.
CPC . *A01C 1/00* (2013.01); *A01C 1/02* (2013.01)

(58) Field of Classification Search
CPC .............. A01C 1/00; A01C 1/02; A01C 1/025
See application file for complete search history.

(56) References Cited

U.S. PATENT DOCUMENTS

| | | | | |
|---|---|---|---|---|
| 6,120,822 | A | 9/2000 | Denvir et al. | |
| 6,195,936 | B1 | 3/2001 | Soll et al. | |
| 6,363,656 | B1 | 4/2002 | Byun | |
| 6,453,609 | B1 | 9/2002 | Soll et al. | |
| 10,986,778 | B2 * | 4/2021 | Chaney | A01M 21/02 |
| 11,344,022 | B2 * | 5/2022 | Jackson | A01M 21/00 |
| 12,219,947 | B2 * | 2/2025 | Jackson | A01M 21/04 |
| 12,457,940 | B2 * | 11/2025 | Mayerle | A01F 12/48 |
| 2013/0255150 | A1 | 10/2013 | Karpinski et al. | |
| 2018/0160629 | A1 | 6/2018 | Redding, Jr. | |
| 2020/0006882 | A1 | 1/2020 | Isagoda | |
| 2022/0008889 | A1 | 1/2022 | Jackson et al. | |

* cited by examiner

*Primary Examiner* — Alicia Torres
(74) *Attorney, Agent, or Firm* — Elting Patents & Technology LLC; Mark J Elting

(57) ABSTRACT

Convection interactions like exposure of seeds to hot ozonated air, hot humidified air, hot ozonated humidified air and optional ultrasound—obtain higher net reduction of germination viability (0-1 percent germination versus 70 percent obtained for a control) of seeds than that obtained via a seed illumination process alone that uses Medium Wavelength Infrared and an Indigo Region Illumination Distribution.

25 Claims, 15 Drawing Sheets

-- Prior Art --

-- Prior Art --

PROXIMITY PASS-THROUGH
CONFIGURATION
ILLUMINATOR

-- PRIOR ART --

CONVECTION INTERACTIONS TO ALLOW FAST HIGHER EFFICACITY IRRADIATION PROCESSES FOR REDUCING VIABILITY OF WEED SEEDS

TECHNICAL FIELD

This invention relates to improvements in total efficacity for reducing germination viability of seeds—including weed seeds and weed seeds scattered among harvest process tailings—when using a fast (or "pulse") seed illumination process that comprises an Indigo Region Illumination Distribution and/or infrared radiation that is substantially Medium Wavelength Infrared Radiation. More specifically, it relates to a discovery regarding the use of what are called here convection interactions like exposure to hot ozonated air, hot humidified air, hot ozonated humidified air and optional ultrasound—to obtain higher net reduction of germination viability than that obtained via the seed illumination process alone. The effect observed was found using certain convection interactions about the seeds for a short time duration on the order of seconds. The invention does not use long term exposure of the seeds to the convection interactions.

Convection is defined herein broadly, as diffusion in which a fluid such as a gas or air as a whole is moving in the direction of diffusion, i.e., bulk flow which can be driven actively in a direction in a barrel, column, floor or passage. See [ref: McGraw-Hill Dictionary of Scientific and Technical Terms 6th Edition by McGraw-Hill (Author), Sybil P. Parker (Author), ISBN-10: 007042313X, ISBN-13: 978-0070423138, p 481]. The convection interactions can include exposure to air injected with ozone; or pre-mixed ozonated air; and can also include injection of steam, or alternatively, humidified air—all with or without applied ultrasound.

BACKGROUND OF THE INVENTION

Agriculture and food industries represent approximately $1 trillion of US GDP (Gross Domestic Product), much of it direct output from over 2 million farms on nearly 900 million acres of land. Modern farming has become a highly-intensive endeavor involving large relative amounts of financial investment and risk, use of complex and expensive equipment, skill and mastery over complex farming techniques and operations, and acutely focused attention to, and knowledge of, crop and animal biology; environments created by weather, effects of soil and decomposing biological matter, and many varied actions of competing plants, animals and microorganisms.

Weed interference with crops is a huge factor limiting crop and agricultural productivity in North America and around the world. In every farm field, weed populations can reduce crop yields, via deleterious effects on crop growth and development, and via competition for light, water, and nutrients. Herbicides are widely used to manage weed seed populations, but many weeds cannot be fully controlled and they ultimately produce seeds which form part of a soil seedbank that can survive for years and provide a ready supply of new weeds. This affects profitability of farming operations, and the weed seed bank composition can affect the sale value of agricultural land.

In particular, crop yields are most affected during early crop development, and there is a Critical Period for Weed Control (CPWC) to avoid unacceptable crop yield parasitic losses. Chemicals excreted into soil by a weed can affect growth and development of a crop species. This is so-called allelopathy, where exudation of chemical compounds by one plant has negatives on a neighboring plant. In the fight for survival, plants rely on a complex sensory system to detect the presence of neighboring plants, resulting in compensatory mechanisms like shade avoidance, which tends to cause more leaf growth, and taller stem growth, at the expense, relatively, of root development. This affects the normal course of growth and development. Farmers often rely on herbicides, tillage and the use of cover crops and organic weed control techniques to keep weed populations low to not reduce yields and overall profitability.

One goal is to reduce the size of the weed seed bank. See [REF: Dynamics and management of crop-weed interference, Eric R. Page, Chris J. Willenborg, Praire Soils & Crops Journal, Volume 6, 2013, pgs 24-32]. Weed seeds include: palmer amaranth, waterhemp, common lambsquarters, giant foxtail, velvetleaf, ivyleaf morning glory, giant ragweed, common cocklebur. These and other plant seeds are storage organs for resources needed to support germination and the energy reserves are an excellent food source for animals that live in agricultural fields, such as ground beetles, crickets, and mice. Such animals consume a small portion of the weed seed bank, but typically most of the weed seed bank remains. Another weed, *Amaranthus tuberculatus* or tall waterhemp (related to amaranth) affects US agriculture, and is resistant to Roundup®, a systemic glyphosate-based heribicide. Tall waterhemp has also been reported resistant to acetolactate synthase inhibiting (ALS) herbicides and the triazines. ALS inhibitors affect seedling growth, and in older plants, can cause malformation, stunted growth and decreased seed production, and are potent at low levels. Resistance of this weed to acifluorfen and other diphenyl ether herbicides has been reported as well. Tall waterhemp produces three million small black seeds per plant, and its weed seed can persist in the weed seedbank in a dormant state for several years, even decades.

Many other herbicide-resistant weeds are prolific seed producers. Herbicide resistance was first observed over 20 years ago and one third of herbicide-resistant weeds became resistant within the last 5 years. This is a growing problem with critical implications for agriculture, the environment and US Department of Agriculture goal to encourage regenerative farming practices.

Furthermore, reducing the use of pesticides generally for weed and plant control has become an issue of national importance. Ninety-five percent of fresh water on earth is ground water. Ground water is found in natural rock formations called aquifers, and are a vital natural resource with many uses. Over 50% of the USA population relies on ground water as a source of drinking water, especially in rural areas. Use of herbicides adversely impacts the quality of ground water. Most herbicides are persistent, soluble in water, and ingestion at high toxicity levels can be carcinogenic, affecting the human nervous system and causing endocrine disruption. In the USA, concerns about the potential impacts of herbicides on human health, as well as on terrestrial and aquatic ecosystems, have led to a wide range of monitoring and management programs by state and federal agencies, such as the U.S. Environmental Protection Agency (USEPA). For example, atrazine is a toxic, white, crystalline solid organic compound widely used as an herbicide for control of broadleaf and grassy weeds, and has been detected in concentrations problematic for human and animal health.

In agricultural grain production, desirable yield known generally as cash crops or grains can include small seed grains, like alfalfa, canola, flax, grass seeds, millet, mustard, oats, rape seed, rice, rye and triicale; medium-size seeds, like barley, lentils, popcorn, safflower, sorghum, and wheat; and large seeds, like chickpeas, corn, edible beans, lupins, navy beans, peas, soybeans and sunflowers.

Farmers often use cover crops, as an alternative to use of herbicides. A cover crop is intentionally planted as an intermediate step to planting the cash crop and functions to keep weeds from growing through. The cover crop is then killed, often along with the seeds of weeds. Typically, farmers use machines that roll the cover crop, folding it like a mat, in between rows of the cash crop. Cover crop dieback provides nutrients to the soil.

A prime mover for agriculture around the world for harvesting a cash crop is the harvester combine, or "combine," for short. It is so named because it generally performs three functions: [1] reaping the crop (gathering and cutting); [2] threshing the grain, to remove it from the plant that is harvested; and [3] separating the grain from chaff, tailings, and confounding materials, including cleaning and materials handling. Combines are complex, expensive and have helped produce an economic and agricultural boon around the world. Manufacturers include John Deere, Case International Harvester, New Holland, Massey Ferguson, Claas, and others.

In older combine harvester designs, a turning cylinder threshes the crop, then reciprocating straw walkers takes grain from the crop. In newer designs that are more prevalent today, a specialized rotor or twin rotors both thresh and separate the grain from the plant. In hybrid designs, a cylinder threshes the grain, then the grain is passed to two specialized rotors that separate the grain from the plant. The grain is typically loaded using augers or other transport into a tank at the top of the combine, or off-loaded.

Specifically, a unit called a header (cutting platform) divides, gathers and cuts the crop and the harvest is augered or transported to the threshing unit. The threshing unit separates the grain or cash crop from the ears, husks, stems, and straw, and the separator separates grain from chaff, which itself can contain weed seeds. In threshing, impact, rubbing action, and centrifugal forces are used to urge grains or beans from the MOG (material other than grain). Tangential threshing cylinders or units with raspbars, or rotary separation are used, with axial or tangential harvest paths. For information on combine harvesters, see [REF 2: CIGR Handbook of Agricultural Engineering, Volume III, Plant Production Engineering, Edited by CIGR (The International Commission of Agricultural Engineering), Volume Editors Bill A. Stout, Bernard Cheze, Published by the American Society of Agricultural Engineers, © 1999, hereby incorporated in this disclosure in its entirety].

Interestingly, as can be appreciated, combines operated to harvest cash crops also incidentally harvest weeds, whose weed seeds are separated from the rest of the plant and the grain. In combines, weed seeds are indeed successfully separated from the cash crop, but combines nonetheless generate huge amounts of biomass tailings which contain weed seeds. These weed seeds are discarded back into the field with chaff, and remain viable to grow into nuisance weeds in following seasons, and to contribute to the weed seed bank.

There are typically two waste paths coming out of a combine. Larger waste such as straw exits or is "walked" out of the top of the combine machine; and smaller waste is sent out the back of the combine, often tossed by a spreader, either on surface or in a trench. The combine gets nearly all seeds, including those from any cover crop, and from the cash crop. Weed seeds are also sent out back of combine with the smaller waste, often tossed by a spreader. Weed seeds are almost always smaller in size than seeds or grains of the cash crop. In a chaffer or top sieve, adjustable perforations allow grain to penetrate. The top sieve typically oscillates to convey material toward the rear of the machine. An air blast from a fan levitates the mat of material to be sorted and the air flow blows away the light chaff, and also typically, weed seeds. Underneath the top sieve is the lower sieve, which is very similar but has smaller openings. It also oscillates and uses an air blast from a fan to separate grain from chaff. Any material that passes through this lower sieve should be clean grain or cash crop. Any material that passes through the chaffer but not the sieve will go into the tailings return or out the back of the combine. This material, MOG (Material Other than Grain) is spread back on the land/field, and can include light chaff, stalks, pods, cobs, and other plant or non-plant material and notably—weed seeds.

Seed shatter figures importantly in weed seed dynamics. Seed shatter is the percentage of seeds that drop from a weed plant prior to harvest. Weed seed shatter research has shown high retention rates of weed seeds at harvest. Many weeds (such as wild mustard, foxtail, and ryegrass) retain 70% to 99% of seeds. Therefore, for many crops and weeds, a change of state for weed seeds in a harvest to lower germination viability will be effective at reducing weed seedbank levels and controlling weeds. In this sense, there is huge unmet need for reducing the weed seed bank by reducing germination viability.

For further information on combine harvesters, see [REF Combine Harvesters: Theory, Modeling and Design, Petre Miu, CRC Press, Boca Raton, Florida, ©2016, hereby incorporated in this disclosure in its entirety].

Others have attempted to address weed seed control. For example, impact mills have been used to damage weed seeds. The Harrington Seed Destructor, by Raymond B Harrington of Cordering, Australia, disclosed in U.S. Pat. No. 8,152,610 to Harrington (Assignee: Grains Research and Development Corporation, Barton, ACT, AU) teaches fragmentation in a cage mill to damage and render useless weed seeds that would otherwise be discharged during harvesting onto a field. This solution is expensive, typically requires a follow-on vehicle, has high power requirements of 45 kW to −80 kW, and suffers from operational problems such as machine sensitivity to soil, sand, and straw from the combine output causing excessive mill wear, and operationally, an increase in fine dust from the mills resulting in reduced operator visibility, as well as increased maintenance costs, and increased fire risk due to high levels of fine dust generated.

U.S. Pat. No. 6,401,637 to Haller discloses soil irradiation with microwaves. Our lab tests have shown this technique does not work. Microwaves have poor penetration into soil, and a very long time is required to heat up both the soil and any weed seeds. Also, microwaving seeds directly took longer in our lab tests, did not achieve workable and practical seed sterilization. Weed seeds in soil can quickly sink deeper into the soil after a rain.

Others have attempted to use heat to destroy weed seeds. While cooking a weed seed, to high temperatures will render it useless, wholesale heating of tailings is time-consuming and expensive and not practical given the large masses involved. In a prior art technique called solarization, sunlight and dark-shielding materials laid out on the ground are used to trap heat and elevate soil temperatures. Solarization is also time-consuming, and can take hours, working under ideal conditions, and there is the unaddressed question of substantial thermal mass of weed seeds shorn from the weed plants to treat from a typical combine process during operation. See [REF 4: Weed Science 2007 55:619-625 Time and Temperature Requirements for Weed Seed Thermal Death, Ruth M. Dahlquist, Timothy S. Prather, James J. Stapleton].

Some have attempted to use exhaust heat from a combine harvester to treat weed seeds. Such methods are time-consuming, cumbersome to effect, and ineffective. In one reference, temperatures of 75-85 C were insufficient to significantly reduce germination of seeds after three exposure durations. See [REF 5: Killing Weed Seeds with Exhaust Gas from a Combine Harvester, September 2019, Klaus Jakobsen, Jakob A. Jensen, Zahra Bitarafan, Christian Andreaen, Agronomy (received 16 Aug. 2019) DOI: 10.3390/agronomy9090544].

Generally, seeds are special, being relatively robust, with significant water content, such as 18% water content, and they typically possess an outer protective shell. Seeds can sit 20 years in dry soil before germinating. Indeed, weed seeds are difficult to make unviable as they can stay viable even after having been in soil for decades. Some seeds have remained viable for 1600 years. Reports show a typical 40 years of viability even after residing in the soil, through temperature changes and the heaving and thawing of that soil. Seeds possess hard shells on the outside (the seed coat) that help preserve them from damage.

Now referring to FIG. 1, a schematic representation of a general electromagnetic spectrum for wavelengths of radiation of significance that are potentially incident upon a plant, with wavelengths ranging from 1 mm to less than 100 nm, is shown. In the infrared portion, or heat radiation portion of the electromagnetic spectrum, there are subdivisions for Far-Infrared (FAR), mid or Medium Wavelength Infrared (MWIR) and near-infrared (NEAR) all in total ranging from 1 mm to 700 nm or 0.7 microns. Visible light (Visible Light) is commonly taken to range from 700 nm to 400 nm. Ultraviolet (Ultraviolet) radiation is generally taken to be of wavelength less than 400 nm, with near-ultraviolet further divided according to some consensus into known portions UV-A (400-320 nm), UV-B (320-280 nm) and finally, UV-C (280 nm-100 nm) which is extremely dangerous for humans and is often used as a germicidal radiation to purify water and kill bacteria, viruses, and other organisms.

There are competing standards for labeling portions of the electromagnetic spectrum, as promulgated by ISO (International Organization for Standardization); DIN (Deutsches Institut fOr Normung e.V). (German Institute for Standardization) and others.

It is important to note that in this disclosure and the appended claims, these and certain other subdivisions shall have particular meanings assigned here and will be defined herein in the Definitions Section.

Now referring to FIG. 2, a cartesian plot of both unfiltered solar radiation and net (ground) solar radiation is shown, with spectral radiance in watts per square meter per nanometer versus wavelength in nanometers (nm) is shown. Note that nearly all the natural infrared radiation in sunlight is essentially in the region in or about near infrared (NIR), with wavelength shorter than 2 micrometers. This is in contrast to the unnatural Medium Wavelength Infrared illumination taught and claimed in the instant disclosure applied to seeds.

Approximately seven percent of the raw electromagnetic radiation emitted from the sun is in a UV range of about 200-400 nm wavelengths. As the solar radiation passes through the atmosphere, ultraviolet or UV radiation flux is reduced, allowing that UV-C ("shortwave") radiation (200-280 nm) is completely absorbed by atmospheric gases, while much of the UV-B radiation (280-320 nm) is additionally absorbed by stratospheric ozone, with a small amount transmitted to the Earth's surface. Solar UV-A radiation (320-400 nm) is essentially, for practical purposes, not absorbed by the ozone layer. Reference is now made to U.S. patent application Ser. No. 16/923,079 to Jackson. The entire disclosure of this prior filed patent application. is incorporated herein by reference in its entirety and its subject matter arises from the same owner and obligation to assign.

The use of microwaves as part of the convection interaction of the instant teachings and appended claims would not find much evidence of motivation in the prior art. In the prior art, ultrasound treatments of seeds are primarily used to improve,—not degrade—the germinability of seeds. See [ref] Ultrasonics Sonochemistry Volume 96, June 2023, 106434, "Ultrasound treatments improve germinability of soybean seeds: The key role of working frequency;" Jiahao Chen a, Feng Shao, Chidimma Juliet Igbokwe, Yuqing Duan, Meihong Cai, Haile Ma, Haihui Zhang, ShJiahao Chen, Feng Shao, Chidimma Juliet Igbokwe, Yuqing Duan, Haihui Zhang. In this paper, the effects of ultrasound with different frequency modes on the sprouting rate, sprouting vigor, metabolism-related enzyme activity and late nutrient accumulation in soybean were investigated, and the mechanism of dual-frequency ultrasound promoting bean sprout In this paper, the effects of ultrasound with different frequency modes on the sprouting rate, sprouting vigor, metabolism-related enzyme activity and late nutrient accumulation in soybean were investigated, and the mechanism of dual-frequency ultrasound promoting bean sprout development was explored. The results showed that, compared with control, the sprouting time was shortened by 24 h after dual-frequency ultrasound treatment (20/60 kHz), and the longest shoot was 7.82 cm at 96 h. Meanwhile, ultrasonic treatment significantly enhanced the activities of protease, amylase, lipase and peroxidase ($p<0.05$), particularly the phenylalanine ammonia-lyase increased by 20.50%, which not only accelerated the seed metabolism, but also led to the accumulation of phenolics ($p<0.05$), as well as more potent antioxidant activity at later stages of sprouting. In addition, the seed coat exhibited remarkable cracks and holes after ultrasonication, resulting in accelerated water absorption. Moreover, the immobilized water in seeds increased significantly, which was beneficial to seed metabolism and later sprouting. These findings confirmed that dual-frequency ultrasound pretreatment has a great potential to be used for seed sprouting and promoting the accumulation of nutrients in bean sprouts by accelerating water absorption and increasing enzyme activity.

Seeds were treated with three modes of ultrasound (60 kHz, 20/60 kHz, 20/40/60 kHz). Ultrasonic treatment was removed in the control group, and the other conditions were consistent with the experimental group.

In another example, US Patent Publication 20180160629 to Redding teaches ultrasonic treatment of dry seed to enhance germination, the seed being sonically treated to sound energy at a frequency and energy density and applying alternating ultrasonic waveforms for a sufficient time such that the sonically-treated dry seed has an enhanced germination characteristic and a plant resulting from the sonically-treated dry seed has an enhanced growth characteristic.

Also, U.S. Pat. No. 6,453,609 to Soil teaches a method to perform sonification and a imbibition process to uptake a substance into a seed. The seed to be treated is immersed in water or other liquids. Resultant cavitational forces by collapse of microbubbles in contact with the seed allow entry of beneficial substances into the seed. Upon germination, the resultant plant maintains enhanced growth characteristics. U.S. Pat. No. 6,195,936 to Soil teaches a similar method where the sonification is directed to a liquid that includes a dissolved gas and a pesticide capable ot enhancing a growth characteristic of the seed.

Similarly, U.S. Pat. No. 5,950,362 to Shors teaches a method for enhancing seed germination, also by immersing the seed in an aqueous solution including dissolved gas sonicating that solution. The sonicated seed exhibits a reduction in the time required for germination, an increase in the percentage of total seeds that germinate, and an increase in the percentage of seeds that germinate at reduced temperatures. Plants grown from the treated seeds exhibit improved characteristics.

Further, US Patent Publication 20060100551 to Schultheiss teaches a method to stimulate plants with acoustic waves. An acoustic shock wave generator is directed to plant tissue having cells. The tissue can be a seed, zygotic embryo or somatic embryogenic culture of somatic embryos of plants. The plant may be a vegetable, tree, shrub or tuber. The tissue may be a part of the root system, a part of the stem system or a part of the leaf system. The method of stimulating includes activating the cells within the treated tissue thereby releasing growth factor proteins or other chemical compositions promoting growth and accelerating germination or plant growth.

Seeds, in order to germinate, must rapidly create functioning chloroplasts. Reactive oxygen species may play a role in whether a seed successfully transitions to a growing plant. Also, in the convection interaction step in the instant teaching and appended claims, ozone figures importantly, to reduce germination viability. However, the prior art teaches beneficial uses for ozone instead—see US Patent Publication 20200068822 JENNINGS which teaches a method of growing seeds in a hydroponics arrangement to provide animal feed. It includes exposing prepared seeds to gaseous ozone in a range of 5-10 ppm for 50-60 minutes, or 10-20 ppm for 1-30 minutes, in a relative humidity range of 40-50% and at an ambient temperature of 12-28 C. In U.S. Pat. No. 6,363,656 to Byun, there is no motivation to use wet ozone to retard germination. Byun seeks to germinate and dry grain using water spray with dissolved oxygen in the water. In U.S. Pat. No. 6,120,822 to Denvir, humidified ozone is used to decontaminate agricultural product.

SUMMARY OF THE INVENTION

One embodiment of the invention comprises an enhanced method to induce a change of state of a seeds (S) to having reduced germination viability in a time under one minute, the method comprising:

[1] a convection interaction step effectuated upon the seeds, the convection interaction comprising directing to the seeds in a processing theater an interactant that is any of hot ozonated air, hot humid air, and hot humidified ozonated air; the hot ozonated air and the hot humidified ozonated air having an average ozone concentration floor of 7 ppm (parts per million) inside at least part of the processing theater;

[2] illuminating the seeds in the processing theater to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation;

thereby boosting net efficacity of the enhanced method so as to reduce germination viability further than that obtained via only illuminating the seeds using step [2] alone.

The method can be practiced wherein the temperature of at least one of the of hot ozonated air, the hot humid air, and the hot humidified ozonated air has an average temperature in a substantial part of the processing theater of any of 140 F-300 F; 301 F-400 F; 401 F-450 F; and 451 F—to a fire temperature limit.

The hot humid air and the hot humidified ozonated air can flow through at least part of the processing theater and can possess in proportion a water content equal to 0.05 percent or greater of a mass of the seeds to be treated.

The convection interaction of step [1] can also comprise directing ultrasound to the seeds in the processing theater so as to achieve a minimum of 1/10 J/cm$^2$ cumulative energy, and 1/20 W/cm$^2$ applied power density, but no more than 7 W/cm$^2$ applied power density; and possessing an average frequency of 20 kHz-100 kHz.

The light wavelength distribution can comprise both the Indigo Region Illumination Distribution (IRID) and the infrared radiation that is substantially Medium Wavelength Infrared (MWIR)) radiation.

And the seeds in the processing theater can also pass through a seed destruction mill (SEED DESTRUCTION MILL) so formed, sized, and operated for at least one of fragmentation and damage to a seed.

The Indigo Region Illumination Distribution can include substantially wavelengths ranging from 400 to 500 nanometers.

The Medium Wavelength Infrared radiation can include substantially wavelengths ranging from 2 to 8 microns.

The invention can also include an illuminated harvester combine enhanced process comprising any of reaping (REAPER), threshing (THRESHER), and separating (SEPARATOR) a harvest to form a tailings flow (TAILINGS) that comprises seeds (S); the enhanced process further comprising

[1] a convection interaction step effectuated upon the seeds in the tailings flow, the convection interaction comprising directing to the seeds in a processing theater an interactant that is any of hot ozonated air, hot humid air, and hot humidified ozonated air; the hot ozonated air and the hot humidified ozonated air having an average ozone concentration floor of 7 ppm (parts per million) for at least a part of the processing theater;

[2] illuminating in the processing theater the seeds in the tailings flow (ILLUMINATOR) to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation;

thereby boosting net efficacity of the enhanced method so as to reduce germination viability of the seeds further than that obtained via only illuminating the seeds using step [2] alone.

Once again, the temperature of at least one of the of hot ozonated air, the hot humid air, and the hot humidified ozonated air in this illuminated harvester combine enhanced process can have an average temperature in a substantial part of the processing theater of any of 140 F-300 F; 301 F-400 F; 401 F-450 F; and 451 F—to a fire temperature limit.

Similarly, this illuminated harvester combine enhanced process an be practiced wherein the hot humid air and the hot humidified ozonated air flow through at least part of the processing theater and possess in proportion a water content equal to 0.05 percent or greater of a mass of the seeds to be treated; and similarly, the convection interaction of step [1] can again also comprise directing ultrasound to the seeds in the processing theater so as to achieve a minimum of 1/10 J/cm$^2$ cumulative energy, and 1/20 W/cm$^2$ applied power density, but no more than 7 W/cm$^2$ applied power density; and possessing an average frequency of 20 kHz-100 kHz; And as before, the light wavelength distribution can again comprise both the Indigo Region Illumination Distribution (IRID) and the infrared radiation that is substantially Medium Wavelength Infrared (MWIR)) radiation.

Again as before, the seeds in the processing theater can also pass through a seed destruction mill (SEED DESTRUCTION MILL) so formed, sized, and operated for at least one of fragmentation and damage to a seed.

For the illuminated harvester combine enhanced process, the Indigo Region Illumination Distribution can include substantially wavelengths ranging from 400 to 500 nanometers.

Finally for the illuminated harvester combine enhanced process, the Medium Wavelength Infrared radiation can include substantially wavelengths ranging from 2 to 8 microns.

The invention can also comprise an illuminated harvester combine comprising any of a reaper (REAPER), a thresher (THRESHER), and a separator stage (SEPARATOR), so formed to produce a tailings flow (TAILINGS) comprising seeds (S) passing through a processing theater; and comprising further a convection interaction unit and an illumination unit acting together in the processing theater to perform an enhanced method to induce a change of state of a seeds (S) to having reduced germination viability in a time under one minute, the convection interaction unit and the illumination unit so constructed, supplied, energized, sized, positioned and operated in the processing theater to allow

[1] a convection interaction step effectuated upon the seeds, the convection interaction comprising directing to the seeds in a processing theater an interactant that is any of hot ozonated air, hot humid air, and hot humidified ozonated air; the hot ozonated air and the hot humidified ozonated air having an average ozone concentration floor of 7 ppm (parts per million) for at least a part of the processing theater; [2] illuminating the seeds in the processing theater to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation;

thereby boosting net efficacity of the enhanced method so as to reduce germination viability further than that obtained via only illuminating the seeds using step [2] alone.

And the illuminated harvester combine can practice the invention as listed with the added limitations listed above, for interactant temperature, water content, illumination wavelengths, etc.

Finally, the invention can comprise a harvest (Q) comprising seeds (S) having been subjected to an enhanced method to induce a change of state of the seeds to having reduced germination viability in a time under one minute, the enhanced method comprising:

[1] a convection interaction step effectuated upon the seeds, the convection interaction comprising directing to the seeds in a processing theater an interactant that is any of hot ozonated air, hot humid air, and hot humidified ozonated air; the hot ozonated air and the hot humidified ozonated air having an average ozone concentration floor of 7 ppm (parts per million) for at least a part of the processing theater;

[2] illuminating the seeds in the processing theater to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation;

thereby boosting net efficacity of the enhanced method so as to reduce germination viability further than that obtained via only illuminating the seed using step [2] alone.

DEFINITIONS

Figure 1:
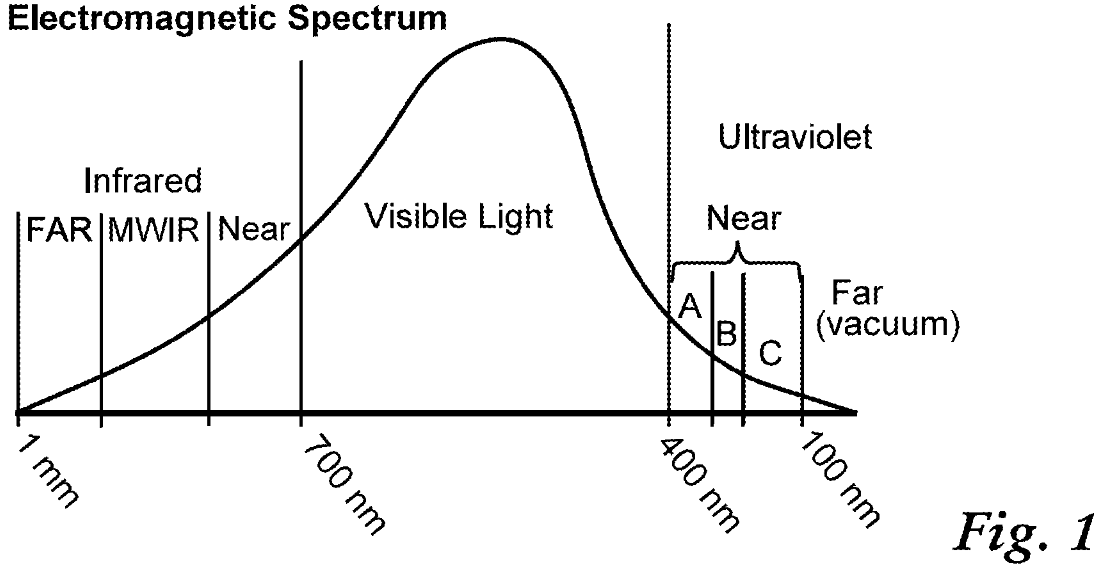
FIG. 1 shows a schematic representation of a general electromagnetic spectrum for wavelengths potentially incident from the sun, with wavelengths ranging from 1 mm to less than 100 nm.
Figure 2:
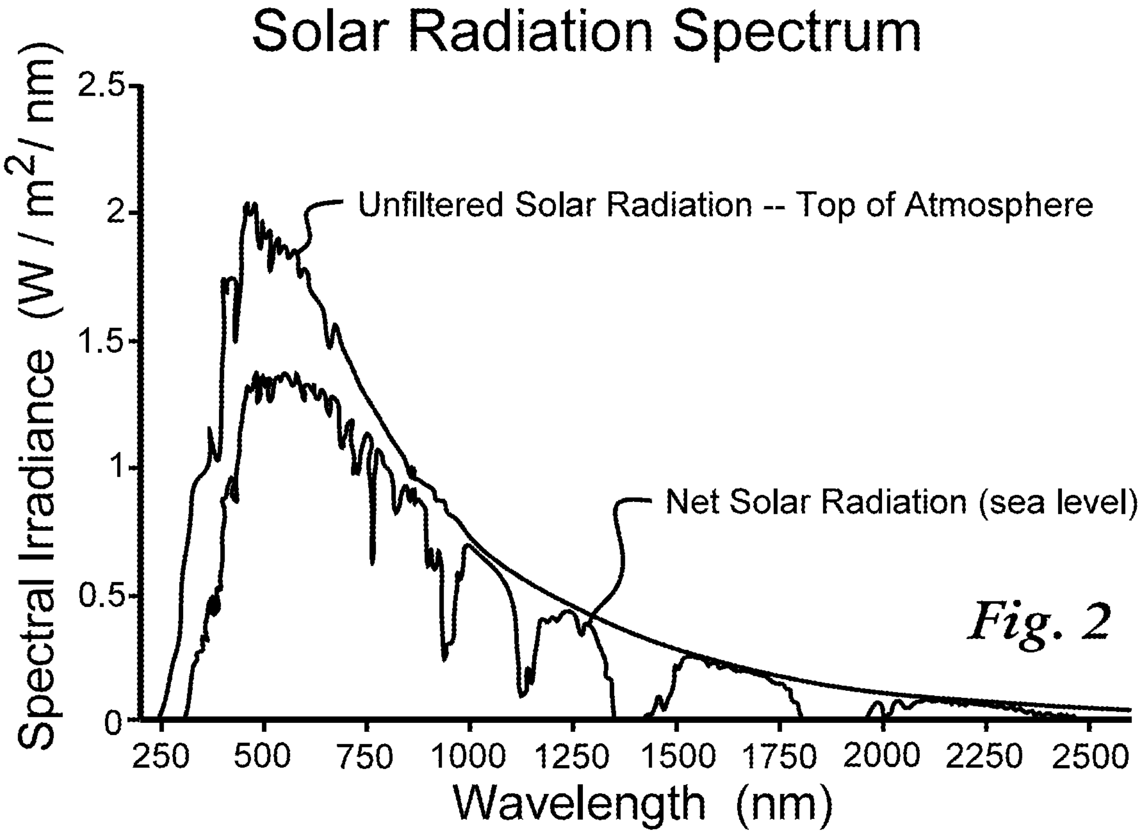
FIG. 2 shows a typical natural filtered and unfiltered solar radiation spectrum using a cartesian plot of spectral radiance versus wavelength.

The following definitions shall be used throughout:

Air—in the specification and appended claims shall comprise any ambient gaseous or fluid environment in which the instant invention is practiced. This can include air mixed with a chemical or biological agent, such as beneficial substances or agents designed to meet objectives not disclosed herein.

Auger—shall include any helical component that effects movement of material, and any component that accomplishes the same function. A spiral-shaped component is not necessary and nor is a spiral path.

Chaff—shall include any of dry, scaly, or protective casings or coverings of seeds, such as parchment or endocarp-like coverings, husks or bracts; scaly parts of flowers; straw or finely chopped straw, and husks, stems, other debris connected to a plant, crop, foodstuff or harvest as defined here; and can also include stems, grass, leaves, sticks, heads of plants such as wheat head; attached soil, and field debris.

Change of state to having reduced germination viability—shall connote primarily a statistical attribute, namely, a decrease in the percentage of seeds capable of later producing growing plants for a given set of environmental conditions.

Coat/seed coat—shall denote casings, or other plant material surrounding a seed

Combine—shall be any machine that reaps, threshes and separates a harvest, as defined herein.

Convection/convection interaction—is defined herein broadly, as diffusion in which a fluid such as a gas or air as a whole is moving in the direction of diffusion, i.e., bulk flow which can be driven actively in a direction in a barrel, column, floor or passage. See [ref: McGraw-Hill Dictionary of Scientific and Technical Terms 6th Edition by McGraw-Hill (Author), Sybil P. Parker (Author), ISBN-10: 007042313X, ISBN-13: 978-0070423138, p 481]. Convection interactions can include exposure to any of hot ozonated air, hot humid air, and hot humidified ozonated air, all with or without applied ultrasound.

Damaged—as in damaged seed coat, shall refer to any material damage or degradation of a seed coat or a portion thereof, including punctures, dents, deep scratches, deformations, or significant abrasions.

Field—shall include any agricultural surface, whether outside or inside a greenhouse or growing facility, and also any surface or place upon which the instant invention is practiced.

Germination viability—in this disclosure shall can be expressed as, and shall denote, unless otherwise stated, the percentage of seeds capable of later producing growing plants for a given set of environmental conditions.

Harvest—shall denote any agricultural product or biological material treated using the teachings of the invention, such as a harvest on a field or any reaping of live plants, whether considered a foodstuff or not; and also any biological product or material arrayed for treatment according to the instant invention. Harvest, as defined here, shall also include any agricultural product or crops or plants that have been reaped, cut, rolled, burned, tamped, shredded, or otherwise manipulated or treated by means other than by use of the instant invention.

Heater/Heating—shall include all thermal production and transfer, from any heat source, via contact or conduction; convection; or radiation.

Humidity—shall include moisture or water or watervapor added or mixed with any interactant to practice the invention.

Illumination—shall be interpreted broadly and shall include all manner of radiative processes as defined by the appended claims, and shall not be limited to lamp outputs, but rather shall encompass any and all radiation afforded by physical processes such as incandescence or any light emission process such as from a light emitting diode (LED); flames; or incandescence from hot masses, such as gases, fluids, steam, metal knives or hot infrared emitters—and can encompass multiple sources. Lamps shown illustratively in this disclosure shall not be considered limiting, in view of the appended claims.

Illuminator—shall denote light sources as taught herein for practicing the instant invention.

IRID/Indigo Region Illumination Distribution—shall denote a preferred range of frequencies, such as emitted by commercially available blue LED (light emitting diode) light sources with emission peaks named “royal blue” that denote a possible range of wavelengths that serve the instant invention. This definition shall include an Indigo Region Illumination Distribution to be defined to be any of the following wavelength ranges:

[1] A preferred range: 420-450 nm; [2] a larger preferred range of 420-480 nm; [3] a larger preferred range of 400-500 nm; [4] a yet larger preferred range of 400-550 nm; [5] and a broad range of 300-550 nm. This “indigo band” does not have to include indigo or blue or any particular “color” and does not have to include wavelengths in the preferred range of—wavelengths of 420-450 nm that are commonly assigned to indigo or near indigo as human perceptions. The is addition of light for any reason, including for a trademark or appearance effect, e.g., aquamarine, shall not affect this definition. An Indigo Region Illumination Distribution IRID can include monochromatic, multichromatic frequency/wavelength lines or bands, continuous or noncontinuous distributions, and distributions that comprise one of more emission lines, or distributions that are absent the general wavelength or frequency for which it is named, i.e., a distribution that is absent wavelengths generally given for indigo, that is, absent approximately 420-450 nm. Metamerism and the response of the human visual system to identify or form color perceptions shall not narrow this definition.

Interactant—shall be a gas, vapor, or mixture as specified in the appended claims IRID Emitter (88)—shall denote any light producing device that has the requisite electromagnetic output properties to help produce an Indigo Region Illumination Distribution IRID that allows service to the instant invention as described in the appended claims, and can be an LED array IRID emitter 88, a laser, or an excited material body. An IRID emitter and a MWIR emitter can be combined into one body or component, or device.

Medium Wavelength Infrared—MWIR—has been variously defined by different international organizational bodies, sometimes using different terms. For example In the CIE division scheme (International Commission on Illumination), CIE recommended the division of infrared radiation into the following three bands using letter abbreviations: IR-A, from 700 nm-1400 nm (0.7 μm-1.4 μm); IR-B, from 1400 nm-3000 nm (1.4 μm-3 μm); and IR-C from 3000 nm-1 mm (3 μm-1000 μm). ISO (International Organization for Standardization) established a standard, ISO20473 that defines the term mid-IR to mean radiation with wavelengths from 3-50 microns. In common literature infrared generally has been divided into near infrared (0.7 to 1.4 microns IRA, IR-A DIN), short wavelength infrared (SWIR or 1.4-3.0 microns IR-B DIN), mid-wavelength (or medium wavelength) infrared at 3-8 microns (MWIR or mid IR 3-8 microns IR-C DIN) to long wavelength infrared (LWIR, IR-C DIN) 8-15 microns to far infrared 15-1000 microns. In this disclosure, throughout the specification, drawings and in the appended claims, MWIR in particular shall have a meaning assigned, and the wavelengths for MWIR shall span from 2-20 microns, and with preferred embodiments in a range of 2-8 microns and sometimes more preferably in a range of 3-5 microns. Source emissions can include emissions from an MWIR emitter E that is formed from materials with known emissivity functions useful in service of the invention, such as known borosilicate glass.

Mill/milling—shall include comminution or damage by grinding, pressing, crushing, cutting orsplitting, and shall include percussive or impact processes, and any processing that pulverizes, reduces to powders, fractures, or otherwise comminutes or damages.

MWIR Emitter (E)—shall denote any glass or material body that has the requisite optical properties or electromagnetic emissivity properties that allow service to the instant invention as described in the appended claims. This can include glass known under the trade name Pyrex® such as borosilicate glass, which is preferred, or Pyrex Glass Code 7740, as well as Pyrex® soda lime glass or other materials, such as aluminum oxide ceramic. Any material body which serves the invention with useful emissivity as an MWIR emitter when stimulated, excited, or heated shall meet this definition. An IRID emitter and a MWIR emitter can be combined into one body or component.

Minute of total operation/time under one minute—shall denote a process of illumination that shall include stepwise, piecemeal, segmented, separated, sequential, variable, or modulated exposures that when totaled, have a summed duration or the equivalent of under one minute, such as four 10-second exposures/flashes over a three minute time, or four ¼ second flashes in one hour.

Motion/in motion—shall include all generally moving states of a harvest, including [1]continuous motion; [2] stepwise motion that can include pauses, starts and stops, or even has reversals—in any combination; and motion induced by vibratory elements or supports that cause a harvest to generally progress, but not always progress, in space Non-invasive—shall include the attributes of not requiring stabbing, cutting, striking or significant mechanical stressing, except for contact with hot bodies or hot fluids such as hot gases or steam when used as a thermal equivalent of Medium Wavelength Infrared radiation as taught here.

Powder coat—shall include any and all coverings, coatings, surface treatments, appliques, and depositions to a surface, including using materials as disclosed, such as borosilicate glass, Pyrex® Glass Code 7740, soda lime glass, aluminum oxide ceramic.

Process—such as referred to in the instant disclosure and appended claims, including referring to a processing theater, can be a process as taught herein that is continuous in time, or non-continuous, including piecewise, piecemeal, stepped, interrupted or delayed application of the methods of the instant invention, and shall also refer to any process for which at least portion of which occurs in real time.

Processing theater—shall comprise any physical area, surface, belt, auger, conveyor, panel, web, screen, mesh, volume or space which facilitates, provides for, or allows illumination and convection interaction according to the instant invention and as described in the specification and appended claims, including any wind tunneling region, auger passage, sorting area, staging area, table, accumulator or harvest flow manifold used for processing of tailings or a harvest. A processing theater can, can comprise a transport area, region, structure, or material body where sorting, collecting, threshing, reaping, parking, consolidating, separating, resting, or landing of a harvest or tailings or a product treatable by the instant invention occurs. The processing theater can also be be segmented or in multiple physically spaced apart sections.

Reaper/reaping—shall include any cutting or gathering process taking place on a field to input, gather, pull, or remove biological matter for treatment according to the instant invention.

Seed—shall include any embryonic plants, or encased plant embyros; agricultural products; and any other biological material such as microbiota, animals, fungi, and bacteria that are susceptible to, or treatable using the instant invention in the manner disclosed in the specification and appended claims. This definition shall apply even with assistance from natural processes that weaken seed coats or can otherwise assist with germination, such as sunlight exposure, heat of a fire, moisture exposure or water immersion, history of passing through an animal's digestive tract, or extreme and seasonal swings in ambient natural temperature or natural light levels.

Seed coat—shall include any protective outer coat of a seed, whether continuously covering the seed, or not; and whether it is hard or soft, pliable or hard, peelable or not easily peelable, and whether of uniform thickness, or having thickness bumps or gaps or thin spots.

Seed destruction mill—shall refer to any process or device which damages seeds, including comminution or damage by grinding, pressing, crushing, cutting or splitting, percussive or impact processes, and any processing that pulverizes, reduces to powders, fractures, or otherwise comminutes or damages.

Tailing/tailings—shall include MOG (Material Other than Grain) and chaff as defined here, and other material that remains after attempted separation of a cash crop or desired grain or seed, from other materials, including undesirable weed seeds and volunteer seeds. Tailings can also include any harvest as defined here, and can be subject to processing according to the instant invention, including any material in an elevator or auger.

Viability/viable—can refer to the capability of a seed of germination under any of suitable, optimum, and sub-optimum conditions. Germination is marked by the development of a plant embryo, and subsequent growth. Viability in this disclosure can be expressed as the percentage of seeds capable of producing plants for a given set of conditions.

Weed seed—shall include any seed (as defined in this section), or portion thereof, treated according to the instant invention, including volunteer crop seeds, cash crops, and cover crops, and shall include any internal structures like the embryo, endosperm, and seed coat of such seeds.

DETAILED DESCRIPTION

Figure 3:
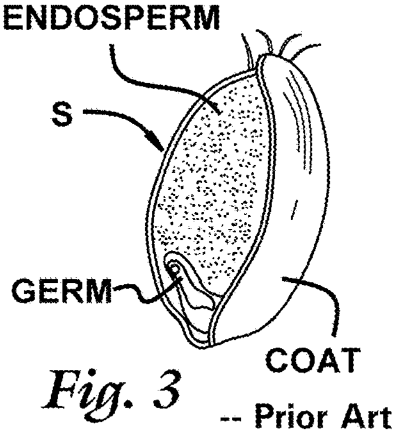
FIG. 3 shows a part surface view, part oblique cutout view of major components of an illustrative agricultural seed.

Referring now to FIG. 3, a part surface view, part oblique cutout view of major components of an illustrative agricultural seed are shown. Seed S is shown comprising an endosperm (ENDOSPERM), a food store for a later developing plant embryo; a germ (GERM) or embryo of the seed; and an outer coat (COAT) which figures importantly in the exposures taught and claimed in this disclosure. Typical sizes for seed S range from 0.025 inch (0.6 mm) to 0.25 inches (6.4 mm).

Figure 4:
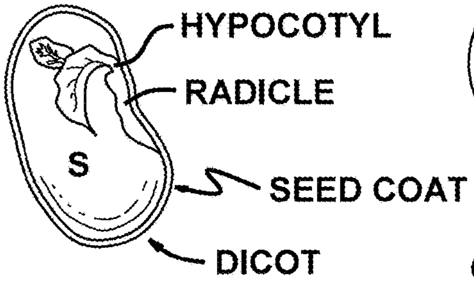
FIG. 4 shows a cross-sectional view of certain illustrative components of a dicot.

Referring now to FIG. 4, a cross-sectional view of some illustrative components of a dicot (dicotyledon) are shown. A dicot is shown illustratively, possessing a radicle (RADICLE), which is typically the first part of the seed that emerges upon germination. As the embryonic root of the plant, it supports the hypocotyl (HYPOCOTYL) as shown, which essentially acts as an embryonic stem of the seed S that would emerge upon germination. Attached to this embryonic stem are two leaves as shown.

This disclosure relates to seeds of all types, among them monocotyldons and dicotyledons. Monocotyledons (associated with one seed leaf, not shown) and dicotlydons (associated with two seed leaves, shown attached to the radicle) differ in early seedling development. In monocotyledons, a primary root is protected by a coating, a coleorhiza, which ejects itself to yield to allow seedling leaves to appear, which are in turn protected by another coating, a coleoptile. With dicotyledons a primary root radicle grows, anchoring the seedling to the ground, and further growth of leaves occurs. Either way, germination is marked by the growth and development of the radicle, and allowing the full development of a healthy plant.

Figure 5:
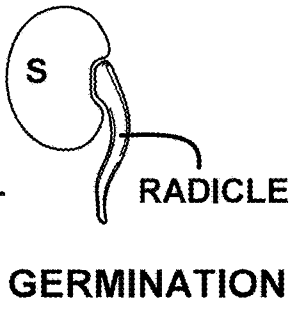
FIG. 5 shows a basic view of a seed after germination and emergence of a radicle.

Referring now to FIG. 5, a basic view of a seed after germination and emergence of a radicle is shown. This is an elongation, as shown, of the embryonic axis from seed allowing subsequent seedling emergence.

The teachings of the instant invention include specific protocols recommended from the findings of new research that tailor the protocol to seeds of various status types.

Figure 6:
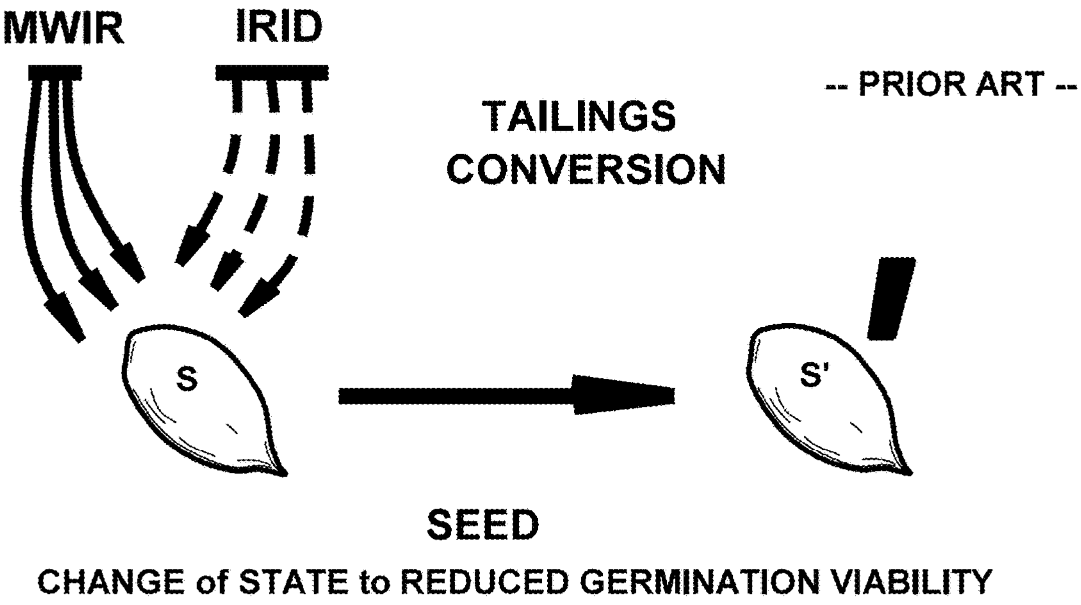
FIG. 6 shows a schematic of a prior art tailings conversion process whereby either or both of Medium Wavelength Infrared and light from an Indigo Region Illumination Distribution, but not convection interactions, are used to induce a change of state to reduced germination viability.

Now referring to FIG. 6, a schematic of a prior art tailings conversion process I shown whereby either or both of Medium Wavelength Infrared and light from an Indigo Region Illumination Distribution, but not convection interactions, are used to induce a change of state to reduced germination viability.

Referring now to FIG. 6, either or both of Medium Wavelength Infrared and light from an Indigo Region Illumination Distribution are used to induce a change of state to reduced germination viability to one or more seeds directly. In the Figure, a seed S is shown undergoing after illumination a change of state to having reduced germination viability, represented by S', a "new" seed that statistically, is less likely to germinate when considered among a statistical ensemble of seeds, such as found in the tailings of an agricultural process, or in a grain silo or other container holding seeds. In this sense, the invention as taught and claimed here can be used as a supplemental treatment for foodstuffs prior to packaging, containment, distribution, or further food processing.

Figure 7:
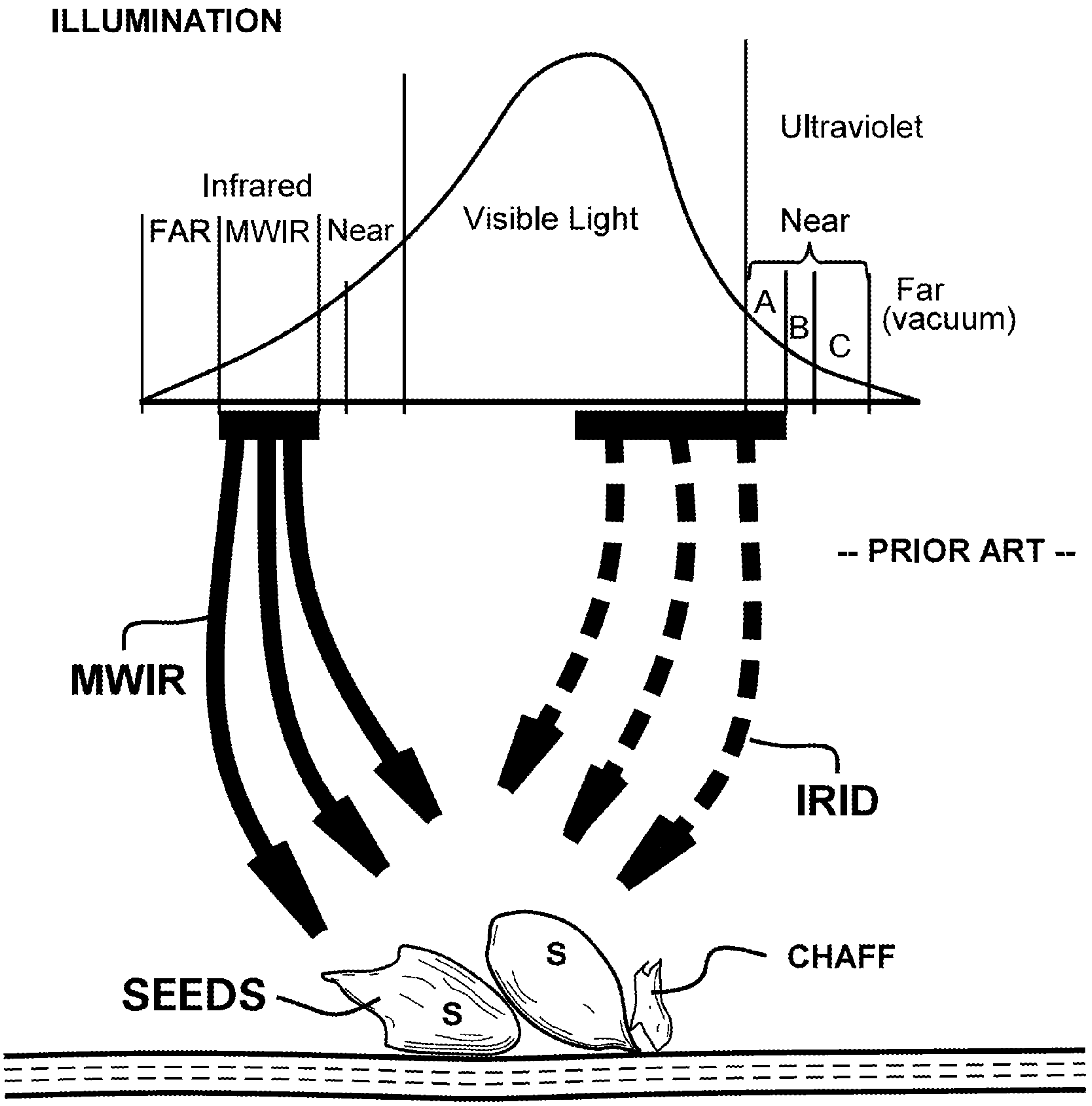
FIG. 7 shows a schematic representation of a prior art process using a dual component illumination protocol shown schematically for two portions of the electromagnetic spectrum (as shown in FIG. 1) being directed upon seeds and chaff resting upon any surface, to induce a change of state of those seeds to having reduced germination viability in the statistical sense.

Now referring to FIG. 7, a schematic representation of a prior art process is shown using a dual component illumination protocol shown schematically for two portions of the electromagnetic spectrum (as shown in FIG. 1) being directed upon seeds and chaff resting upon any surface, to induce a change of state of those seeds to having reduced germination viability in the statistical sense. The illumination load is shown illustratively as a harvest comprising chaff and other materials together resting upon a belt shown, but the materials can rest upon any surface, such as a ground/earth plane or soil, a stainless steel pan or reflector bed, etc. In this protocol, this high speed, substantially non-invasive, low-irradiance method for changing the state of a seed is accomplished in a time under one minute and provides illumination to practice the instant invention, along with convection interactions as described below.

Described briefly, the illumination method comprises:

[1] illuminating a seed to achieve a minimum of at least one of 2 J/cm$^2$ cumulative illumination energy, and 0.20 W/cm$^2$ irradiance, of a light wavelength distribution comprising at least one of an Indigo Region Illumination Distribution (IRID) and Medium Wavelength Infrared (MWIR)) radiation. As will be discussed below, the protocol calls for an Indigo Region Illumination Distribution (IRID) containing substantially wavelengths ranging from 300 to 550 nm, preferably 400 to 500 nm; and a Medium Wavelength Infrared radiation substantially composed of 2 to 20 micron wavelength radiation, preferably 2 to 8 microns.

Figure 8:
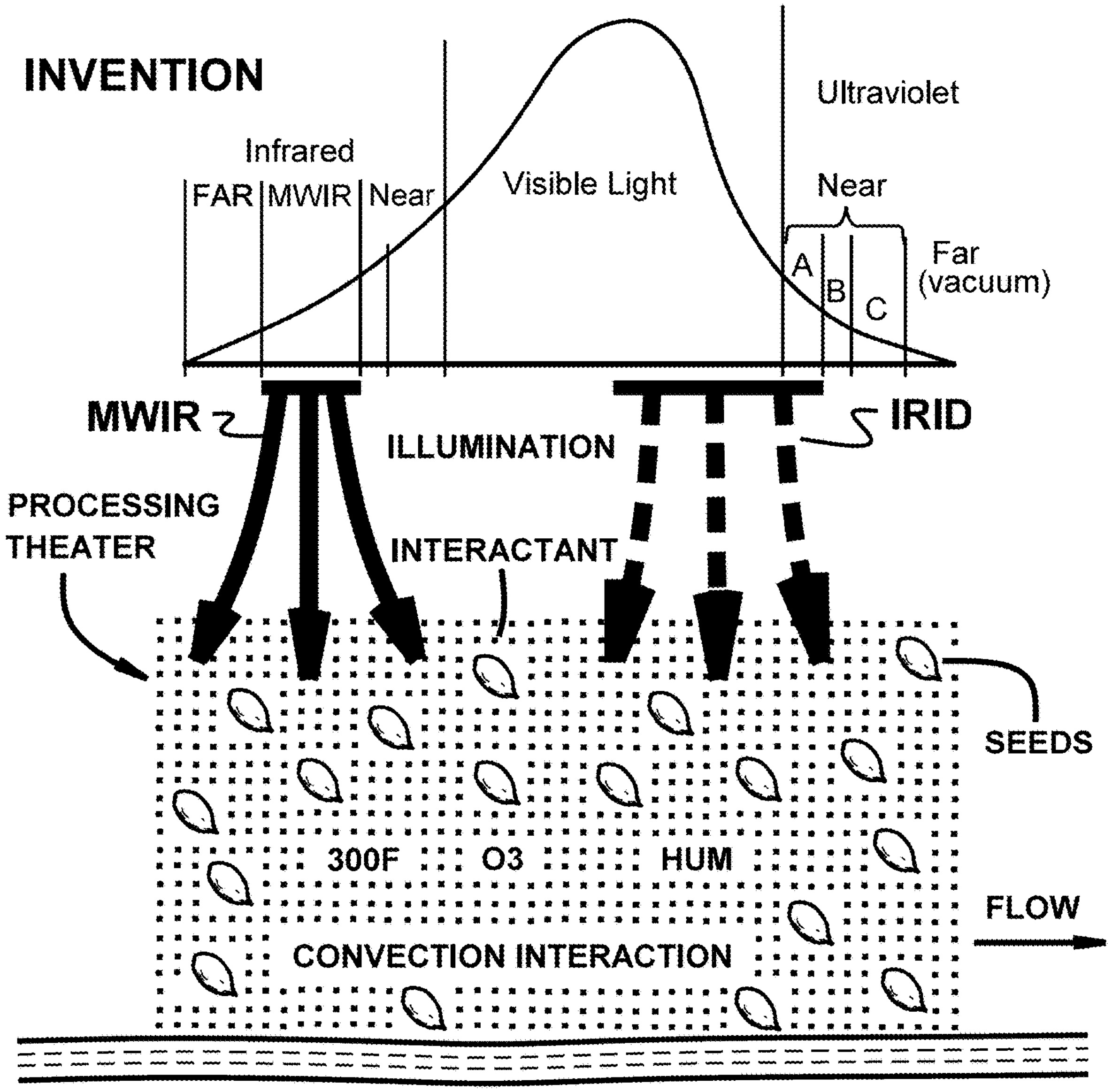
FIG. 8 shows a schematic representation of the process of the invention using a dual component illumination protocol as shown in FIG. 7 schematically for two portions of the electromagnetic spectrum along with convection interaction.

Now referring to FIG. 8, a schematic representation of the process of the invention is shown using a dual component illumination protocol as previously shown in FIG. 7 schematically for two portions of the electromagnetic spectrum, and also using convection interaction.

The process of the invention uses both illumination of seeds and exposure of seeds to convection interactions like exposure to hot (300 F) ozonated air (O3)(hot humidified air (HUM), hot ozonated humidified air and optional ultrasound (not shown)—to obtain higher net reduction of germination viability than that obtained via the seed illumination process alone. Illumination is provided by an illumination unit (ILLUMINATION), while convection interaction is provided by a convection interaction unit (CONVECTION INTERACTION) which provides a PROCESSING THEATER as shown to effectuate a convection interaction upon the seeds. Specifically, the invention comprises an enhanced method to induce a change of state of a seeds (S) to having reduced germination viability in a time under one minute, the method comprising:

[1] a convection interaction step effectuated upon the seeds, the convection interaction comprising directing to the seeds in a processing theater an interactant that is any of hot ozonated air, hot humid air, and hot humidified ozonated air; the hot ozonated air and the hot humidified ozonated air having an average ozone concentration floor of 7 ppm (parts per million) inside at least part of the processing theater;

[2] illuminating the seeds in the processing theater to achieve a minimum of 2 J/cm$^2$ cumulative illumination energy, and 0.2 W/cm$^2$ irradiance, but no more than 7 W/cm$^2$ average irradiance, of a light wavelength distribution comprising at least one of an Indigo Region Illumination Distribution (IRID) and infrared radiation that is substantially Medium Wavelength Infrared (MWIR)) radiation; thereby boosting net efficacity of the enhanced method so as to reduce germination viability further than that obtained via only illuminating the seeds using step [2] alone.

The method can be practiced wherein the temperature of at least one of the of hot ozonated air, the hot humid air, and the hot humidified ozonated air has an average temperature in a substantial part of the processing theater of any of 140 F-300 F; 301 F-400 F; 401 F-450 F; and 451 F—to a fire temperature limit.

The hot humid air and the hot humidified ozonated air can flow through at least part of the processing theater and can possess in proportion a water content equal to 0.05 percent or greater of a mass of the seeds to be treated.

The convection interaction of step [1] can also comprise directing ultrasound to the seeds in the processing theater so as to achieve a minimum of 1/10 J/cm$^2$ cumulative energy, and 1/20 W/cm$^2$ applied power density, but no more than 7 W/cm$^2$ applied power density; and possessing an average frequency of 20 kHz-100 kHz.

The light wavelength distribution can comprise both the Indigo Region Illumination Distribution (IRID) and the infrared radiation that is substantially Medium Wavelength Infrared (MWIR)) radiation.

And the seeds in the processing theater can also pass through a seed destruction mill (SEED DESTRUCTION MILL) so formed, sized, and operated for at least one of fragmentation and damage to a seed. This will be shown below, The Indigo Region Illumination Distribution can include substantially wavelengths ranging from 400 to 500 nanometers.

The Medium Wavelength Infrared radiation can include substantially wavelengths ranging from 2 to 8 microns.

Figure 9:
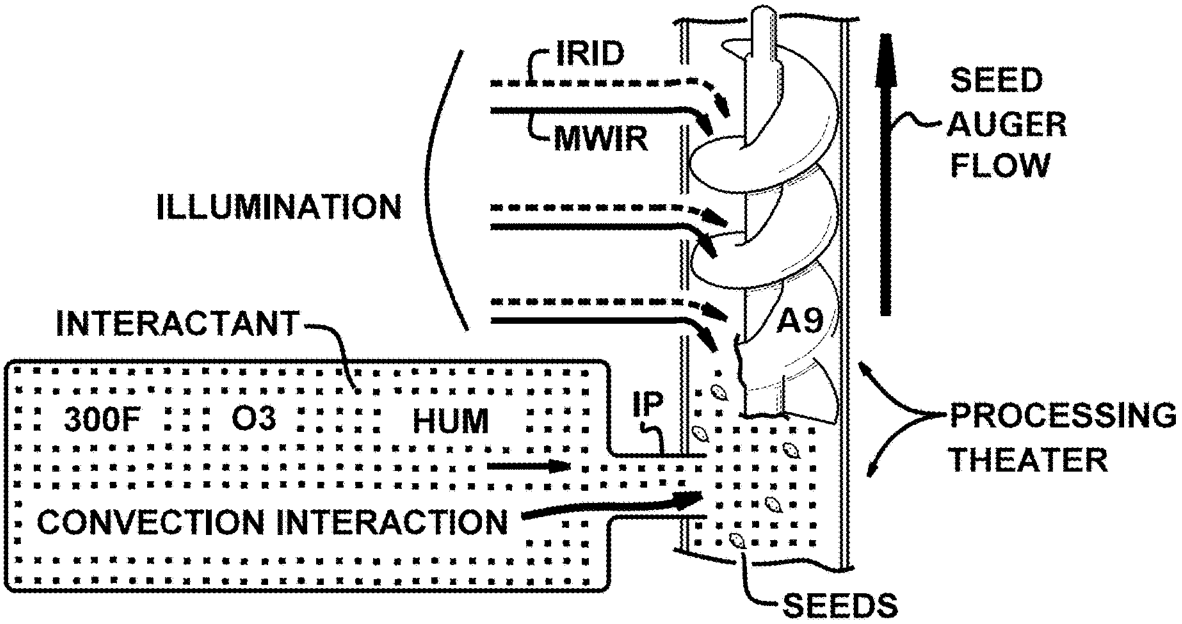
FIG. 9 shows a system according to the invention where the processing theater is an illuminated seed auger tube fed an interactant according to the invention.

Now referring to FIG. 9, a system according to the invention is shown where the processing theater is an illuminated seed auger tube fed an interactant according to the invention. Interactants (INTERACTANTS) are fed via an interactant port IP into a seed auger tube comprising a driven auger with flighting A9 as shown.

Figure 10:
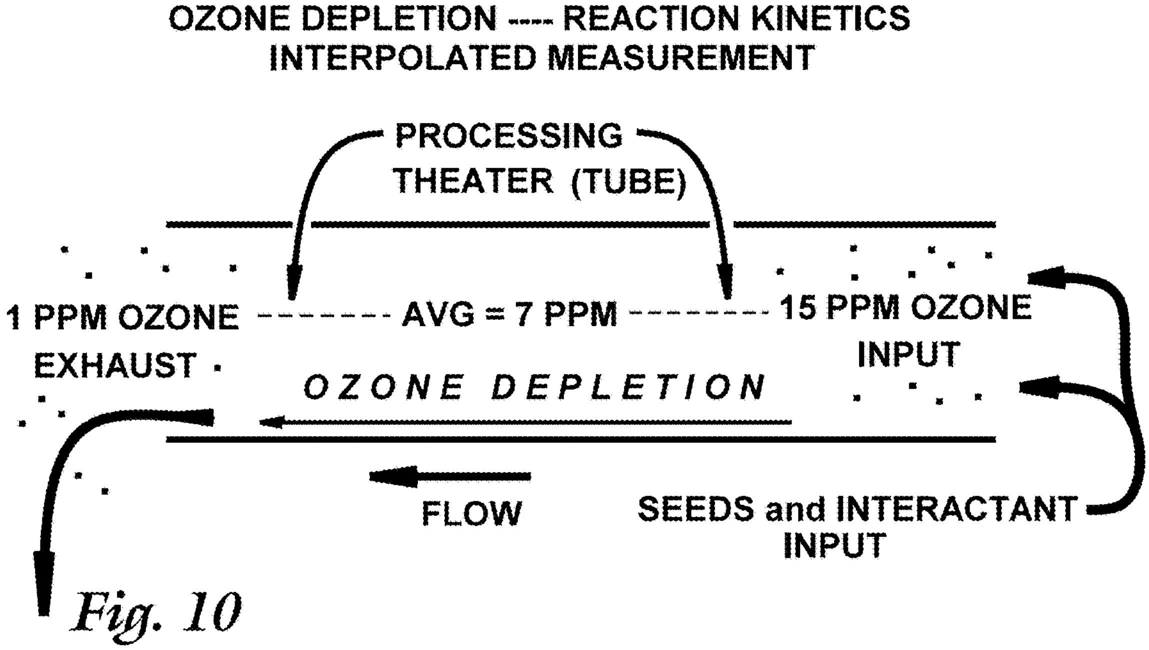
FIG. 10 shows a method to insure a 7 PPM average ozone concentration inside an auger tube against ozone depletion.

Now referring to FIG. 10, a method to insure a 7 PPM average ozone concentration inside an auger tube against ozone depletion is shown. A 15 PPM input in a processing theater tube such as an auger tube with ozone depletion due to reactivity insures a 1 PPM exit concentration mesurable by known instruments, implying an interpolated 7PPm average as shown for at least part of the auger tube.

Figure 11:
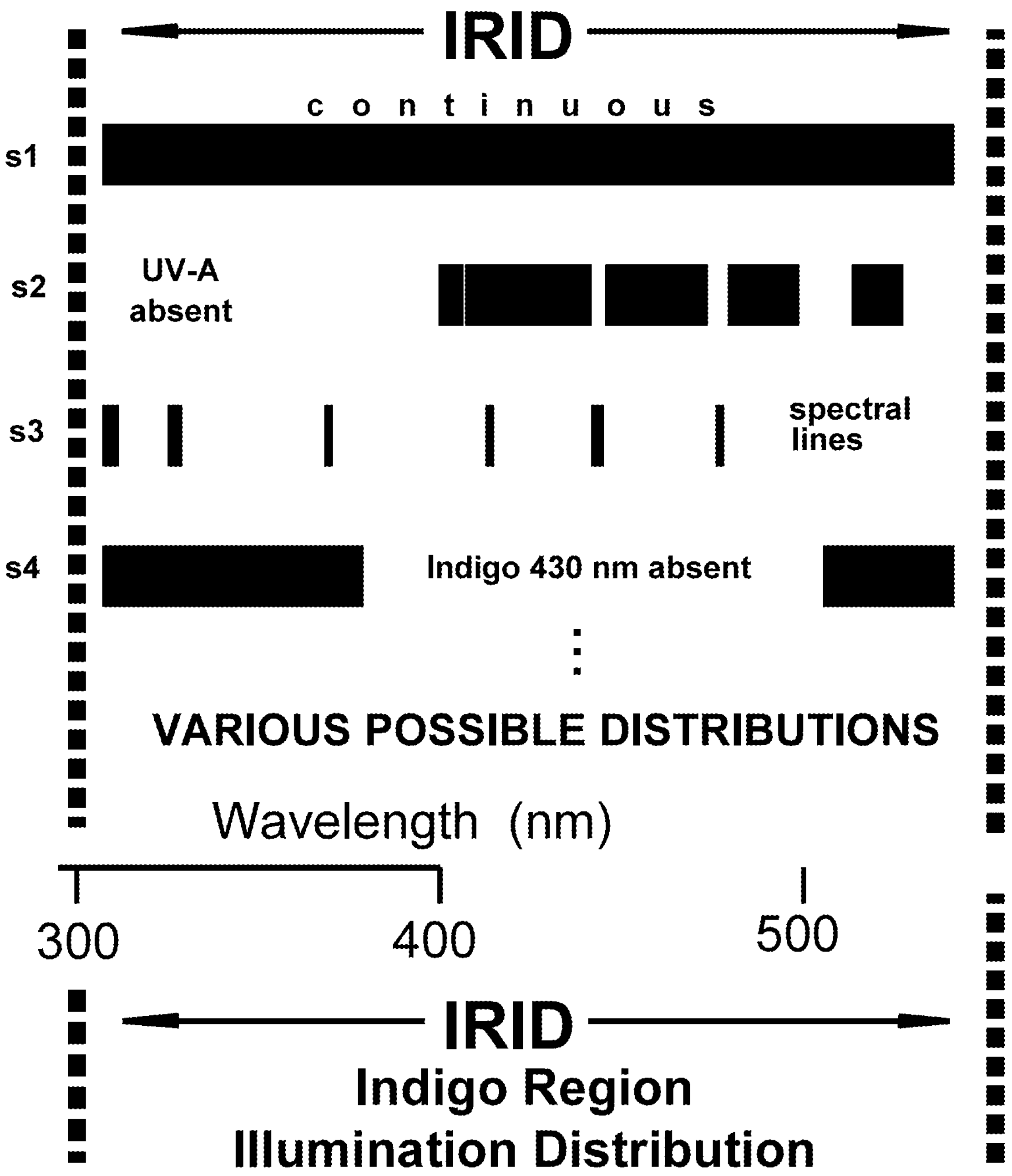
FIG. 11 shows a schematic representation across the range of 300 nm to 550 nm for an Indigo Region Illumination Distribution, with various illustrative possible distribution patterns.

Now referring to FIG. 11, a schematic representation across this range of 300 nm to 550 nm for an Indigo Region Illumination Distribution is shown with various illustrative possible distribution patterns that are possible. This Figure does not show spectral intensity, or spectral irradiance, that is, W/cm$^2$ per unit wavelength—which can vary. The Figure shows only the presence of radiation in particular wavelength, without intensity information.

The first distribution depicted, s1, shows a near full span of the range between 300 and 550 nm, continuous and solid. The second distribution s2 shows another possible distribution from 400 to 550 nn, not continuous and absent UV-A radiation. A third distribution s3 shows various spectral lines of output, with the highest energy radiation at about 480 nm, and consisting of only six emission lines as shown. This can arise from various light sources, such as lasers, and especially ion discharge lamps with no intervening phosphor, etc. A fourth distribution s4 is continuous in part like distribution s1, but is absent mid-wavelengths, and notably is absent wavelengths associated with indigo, for which the Indigo Region Illumination Distribution IRID is named. All these, and other similar distributions are possible in service of the instant invention. However from testing and experimentation, radiation at and around 430 nm appears to be the best for biological effectiveness in weed seed control.

Appearance of the Indigo Region Illumination Distribution IRID to the human eye shall not be indicative of suitability, A Indigo Region Illumination Distribution may not appear “blue” or “indigo” to the human eye because of the effect of constituent wavelength components—and response of the human eye to light distributions, including known effects of metamerism, shall not limit or narrow the scope of the appended claims, nor narrow the instant teachings.

As stated above, a Indigo Region Illumination Distribution IRID contains wavelengths of light substantially coincident with a short wavelength absorption relative peak (generally of wavelength less than 550 nm) of a grown plant. In the protocol taught and claimed in the instant disclosure, the preferred range of wavelengths for the Indigo Region Illumination Distribution is 400-500 nm, with a distribution centered at about 430-450 nm.

Known commercially available high output “blue” LEDs (light emitting diodes) can be used to provide necessary light for Indigo Region Illumination Distribution IRID, providing light generally in a wavelength range from 400 to 550 nm. For example, known SiC (silicon carbide) based LEDs with output from 430-505 nm (appearance blue) are available and have a Forward Voltage of 3.6 volts; GaN (Gallium Nitride) and InGaN (Indium Gallium Nitride) based diodes are also available. Mixture of GaN with In (InGaN) or Al (AlGaN) with a band gap dependent on alloy ratios allows manufacture of light-emitting diodes (LEDs) with varied output peaks. Some LED devices using Aluminium Gallium Nitride (AlGaN) produce ultraviolet (UV-A) light also suitable for a Indigo Region Illumination Distribution, and known phosphors can be used to extend spectral range or to serve another objective such as making a trademark color splash without departing from the scope of the invention and appended claims.

To construct a Indigo Region Illumination Distribution IRID source, commercially available high power UV/violet LED chips are thus available in varied peak distribution wavelengths such as 365 nm, 370 nm, 375 nm, 385 nm, 390 nm 395 nm, 400 nm, 405 nm, and 425 nm with input power ranging from 3 to 100 watts, such as available from Shenzhen Chanzon Technology Co., Ltd., ShenZhen, Guangdong, China. The embodiments shown in Figures which follow employ a 100 watt array, 450 nm peak output. Larger arrays can be built up from constituent chips to serve the requirements of the instant invention for larger scale applications.

Figure 12:
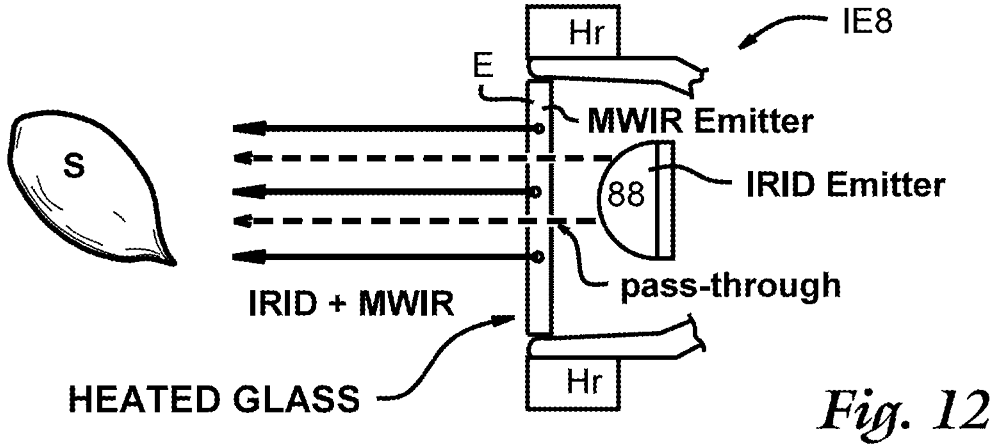
FIGS. 12 and 13 show cross-sectional representations of an illustrative proximity pass-through configuration illuminator according to the invention.
Figure 13:
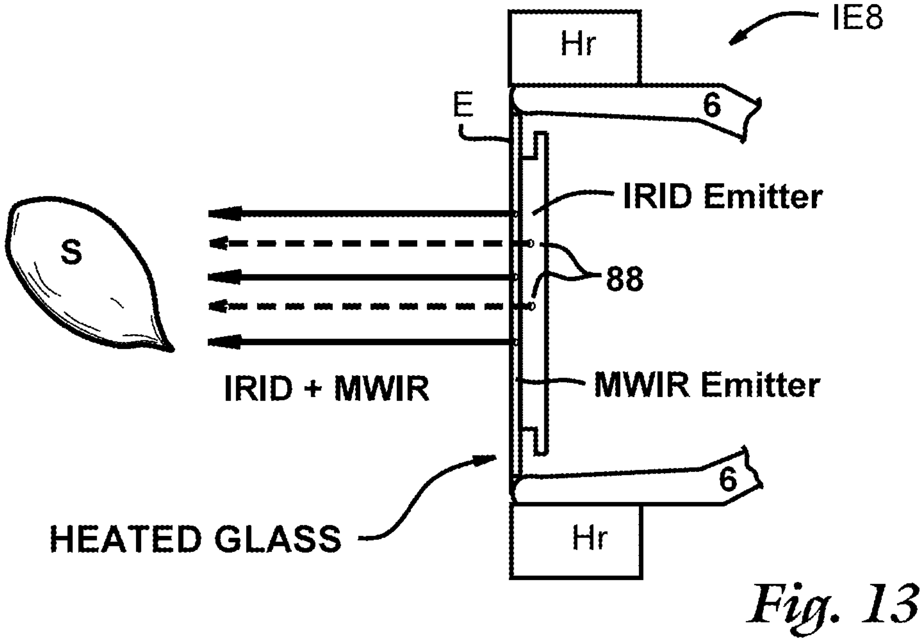

Now referring to FIGS. 12 and 13, simple schematic cross-sectional representations of prior art illuminators useful for the instant invention—specifically a advantageous, compact proximity pass-through configuration illuminator (PROXIMITY PASS-THROUGH CONFIGURATION ILLUMINATOR) are shown. Inside a housing 6, are a IRID emitter 88 and a MWIR emitter E. As can be seen, the IRID emitter and the MWIR emitter are sized, positioned and oriented to allow light output from each of said IRID emitter and MWIR emitter to be substantially superposed for directing to seed S. with rays of type shown in FIGS. 15 and 16 being directed to the seed S at the left of the Figure. Light generated as shown emerging from IRID emitter 88 passes through the physical MWIR emitter E. MWIR emitter E can comprise glass in various forms, such as plate glass, and be can be any of borosilicate glass, Pyrex® Glass Code 7740, soda lime glass, and other materials like aluminum oxide ceramic, and any such as that having high thermal emissivity in the range of Medium Wavelength Infrared wavelengths as defined herein. This can include materials having coatings or surface treatments that have favorable MWIR emission characteristics. The use of Pyrex® or other borosilicate glass was the best mode, by far, in providing Medium Wavelength Infrared radiation that was unexpectedly effective at effecting a change of state to having reduced germination viability for seeds.

MWIR emitter E is heated using a heater assisted by a heating ring Hr as shown, in thermal communication with illustrative glass (e.g., borosilicate glass) of MWIR emitter E. Borosilicate glass and other similar materials conduct heat across themselves, and this heated glass allows efficient coupling into MWIRwavelengths and allows a pass-through of Indigo Region Illumination Distribution IRID light as shown.

Figure 14:
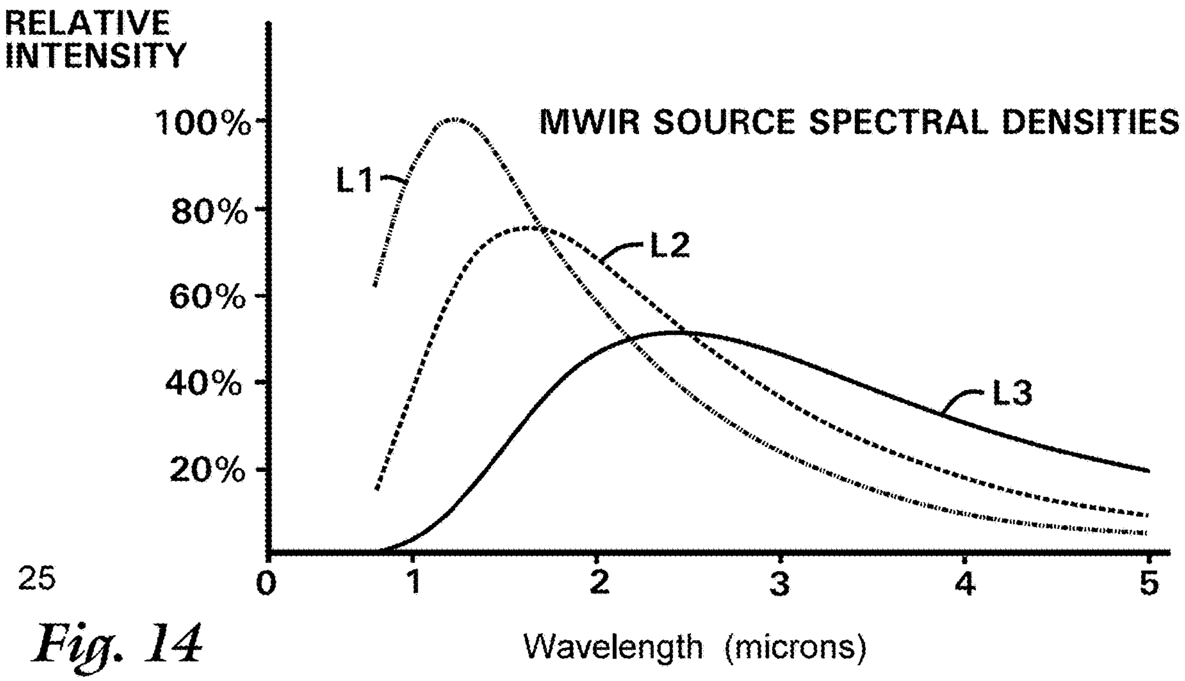
FIG. 14 shows three illustrative cartesian plots of spectral density versus wavelength for three possible Medium Wavelength Infrared light sources for use by the instant invention.

An alternative to heating a preferred borosilicate glass MWIR emitter E using a heating ring Hr is the use of heat sources in the form of commercially available known tubular lamps, and illustrative spectral densities for these are given in FIG. 14.

Now referring to FIG. 14, three illustrative cartesian plots of spectral density versus wavelength for three possible Medium Wavelength Infrared light sources for use by the instant invention are shown. In the instant teachings, the wavelength of the MWIR emitter E figures importantly, with 2-8 microns preferred, including 3-5 microns.

Such tubular lamps provide radiation in service of the instant invention, or provide thermal excitation to produce such radiation, as discussed below (see FIGS. 44-46, and other Figures). They tend to follow closely Wien's displacement law, which states that the black-body radiation curve for different temperatures of the black body will peak at different wavelengths that are inversely proportional to the temperature, a consequence of the Planck radiation law giving the spectral intensity as a function of wavelength for a given temperature. Wien's displacement law states $$\lambda_{peak} = b/T \qquad \text{Eqn 1}$$

where $\lambda_{peak}$ is the peak wavelength (microns); b is Wien's displacement constant, 2898 micron-K; and T is the absolute temperature in Kelvin.

The three spectral plots represent three different tubular lamps:

L1 depicts a spectral density for a clear halogen lamp with a pyrex outer jacket, operating temperature 2400 K, with a peak output wavelength of 1.3 microns. This lamp is preferred to obtain high radiation output because of its high operating temperature, and the output can be used to excite borosilicate glass in proximity, as known by those of ordinary skill in the art of lamp design and heat sources.

L2 depicts a ruby/gold-plated halogen lamp spectral density for a clear halogen lamp with a pyrex outer jacket, operating temperature 1800 K, with a peak output wavelength of 1.6 microns.

L3 depicts a spectral density for a clear halogen lamp with a carbon fiber filament and a quartz outerjacket, operating temperature 1200 K, with a peak output wavelength of 2.5 microns. This lamp is preferred when using as a direct light source to practice the instant invention, because the substantial share of the radiation output is at the preferred range of 2-8 microns.

These above lamps (not shown) are standard configurations and available from Lianyungang O-Yate Lighting Electrical Co., Ltd, Lianyungang City, Jiangsu Province, China.

Figure 15:
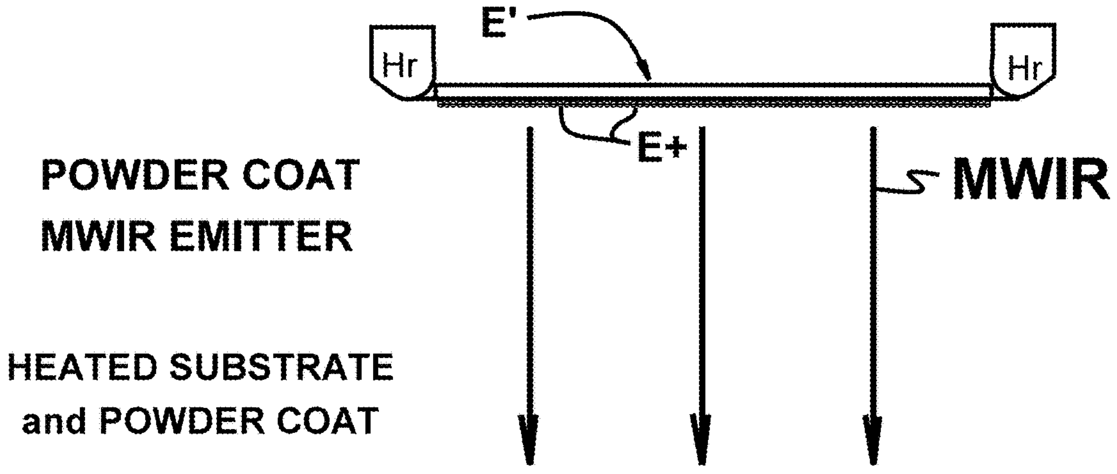
FIG. 15 shows a cross-sectional schematic view of a Medium Wavelength Infrared (MWIR) emitter that employs an emissive powder coat for enhanced emission.

FIG. 15 shows a prior art cross-sectional schematic view of a Medium Wavelength Infrared (MWIR) emitter that comprises an emissive powder coat for enhanced emission. A powder coat MWIR emitter, e.g., ground or powdered borosilicate glass, can be put onto a surface which is heated for operation. Specifically, as shown, powder coat MWIR emitter E+ is affixed or coated upon a heated substrate E', which can derive heat from heat ring Hr or the above tubular lamps alluded to above in the description for FIG. 14. Rays from any Indigo Region Illumination Distribution IRID passing though powder coat MWIR emitter E+ are not shown for clarity. This embodiment can reduce costs and weight, and can allow for optimization of output. This allows the powder coat to be illuminated independently to provide heating. This excitation can include optical radiation (in a variety of possible wavelengths) such as from lamps; glowing filaments or other bodies, microwave radiation, laser light, and flood and spot lamps, such as high intensity halogen enhance filament lamps, or LED lamps, using known reflector or other optics. Arrays can be used that are proximate the powder coat MWIR emitter E+ along a length, or a spot beam can be used. In this illustrative example, a simple substrate which is not an Medium Wavelength Infrared emitter, can be used.

One can use known powdered, sintered, or particulate materials, comprising borosilicate glass or other glasses or MWIR emissive materials, to provide the main radiation source that establishes the specific Medium Wavelength Infrared MWIR called for in service of the invention as taught and claimed. If desired, underlying heated substrate E' can itself be a MWIR emitter E as well. In addition, MWIR emitter E+ can be externally optically energized from a distance—or heated with an external lamp or source (not shown) as those of ordinary skill in the art can appreciate.

It should be noted that based on experimental tests, we concluded that borosilicate glass provides more effective results than anything else tested, including heated quartz. The success of the borosilicate helps to confirm MWIR wavelengths are a key component of borosilicate emissions that destroy the weed seeds, and that UV (ultraviolet light) is not needed.

Figure 16:
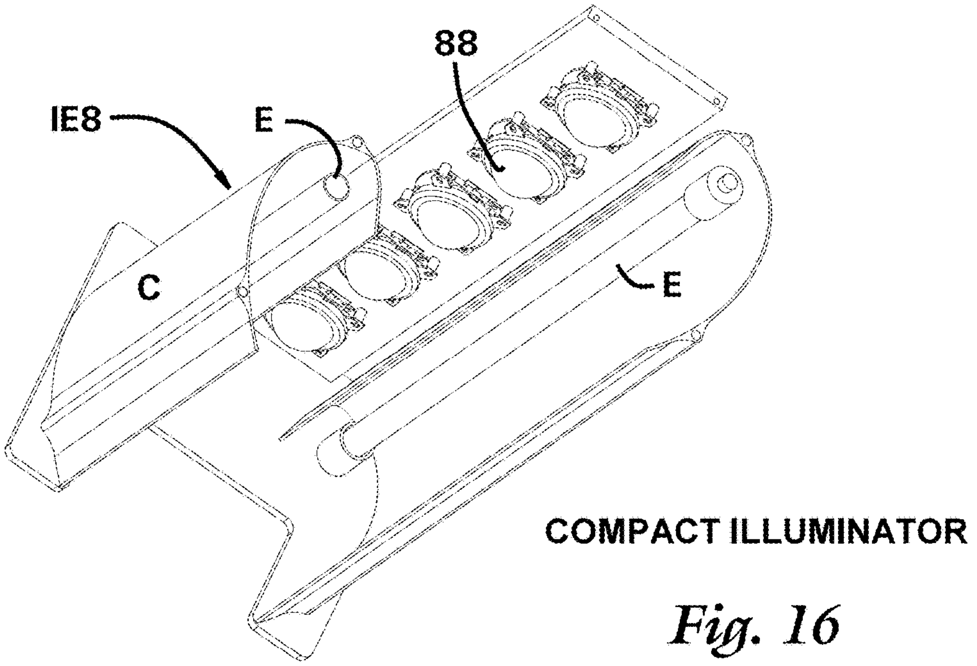
FIG. 16 shows an oblique surface view of a compact illuminator according to the invention.

Referring to FIG. 16, an oblique surface view of a prior art compact illuminator for illustrative purposes is shown. Those of ordinary skill in the art can adapt this to suit any application of the instant invention, including use inside an auger tube. In the illuminator IE8, a housing 22 retains a curved reflector C that surrounds two pipe-like MWIR emitters E as shown, oriented upon an axis (not shown) in the longest direction of the illuminator IE8. Light from pipe-like MWIR emitters E passes downward as in the Figure shown by the rays for Medium Wavelength Infrared MWIR, with assistance of the curved reflector C, as known in the optical arts. A central assembly (not labeled) houses a plurality of IRID emitters 88 that are positioned in between pipe-like MWIR emitters E, and this light, Indigo Region Illumination Distribution IRID, is shown also projected downward in the Figure. IRID emitters 88 are serviced by heat sinks 77 as shown, and can be a 100 watt array, 450 nm peak output LED arrays with peak output at 430 nm, true indigo in appearance and with continuous distributions. The interiors (not explicitly shown) of MWIR emitters E can comprise heaters; or tubular lamps as previously described, such as a clear halogen heat lamp, which essentially acts as a cartridge heater with a glass or quartz exterior. Alternatively, a preferred embodiment can comprise the tubular MWIR emitters E as shown with an emissive coating, such as a known aluminum oxide ceramic, or MWIR emitters E can comprise copper pipes sprayed with glass, or with aluminum oxide thermal spray. Any high emissivity coating on a thermally heated tube could offer advantages so long as the emissions are as called for in the protocol for the invention, preferably Medium Wavelength Infrared in the range of 2 to 8 micron wavelengths.

Figure 17:
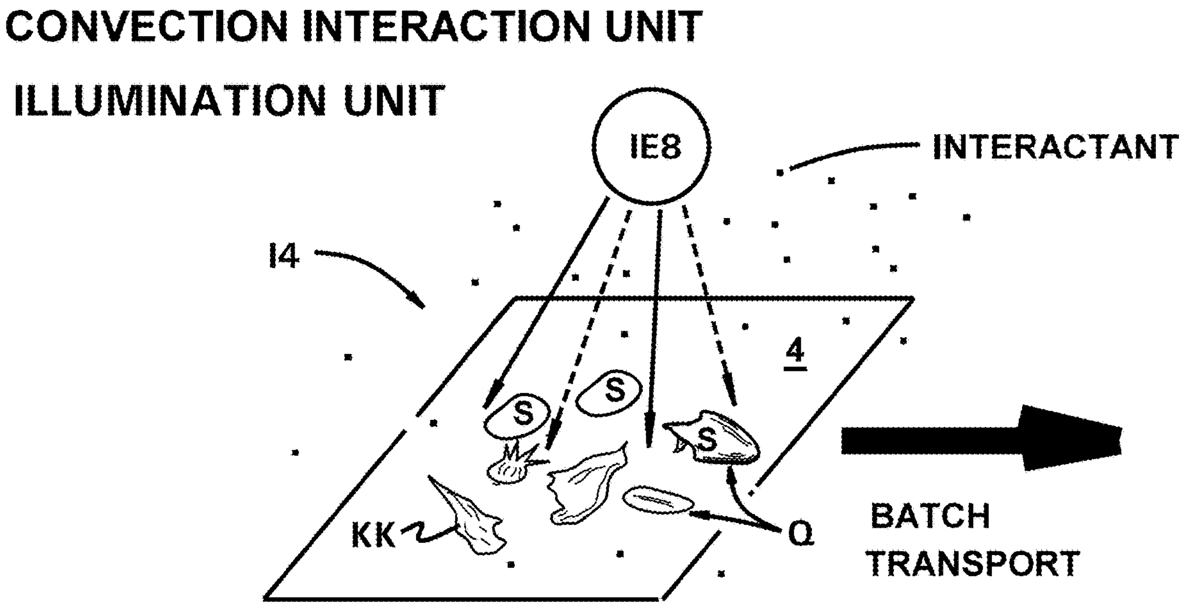
FIG. 17 shows a schematic of the elements of a CONVECTION INTERACTION UNIT with an illumination unit according to the invention.
Figure 18:
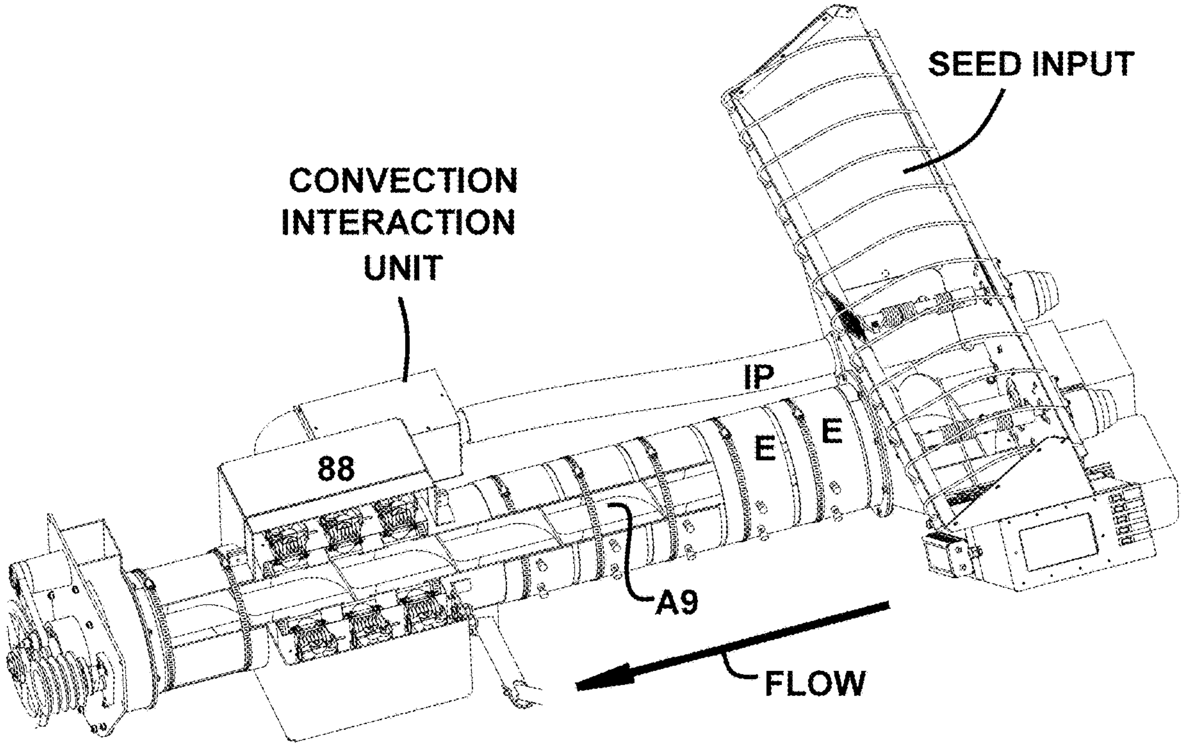
FIGS. 18-21 show oblique surface views of a seed auger system according to the invention.
Figure 19:
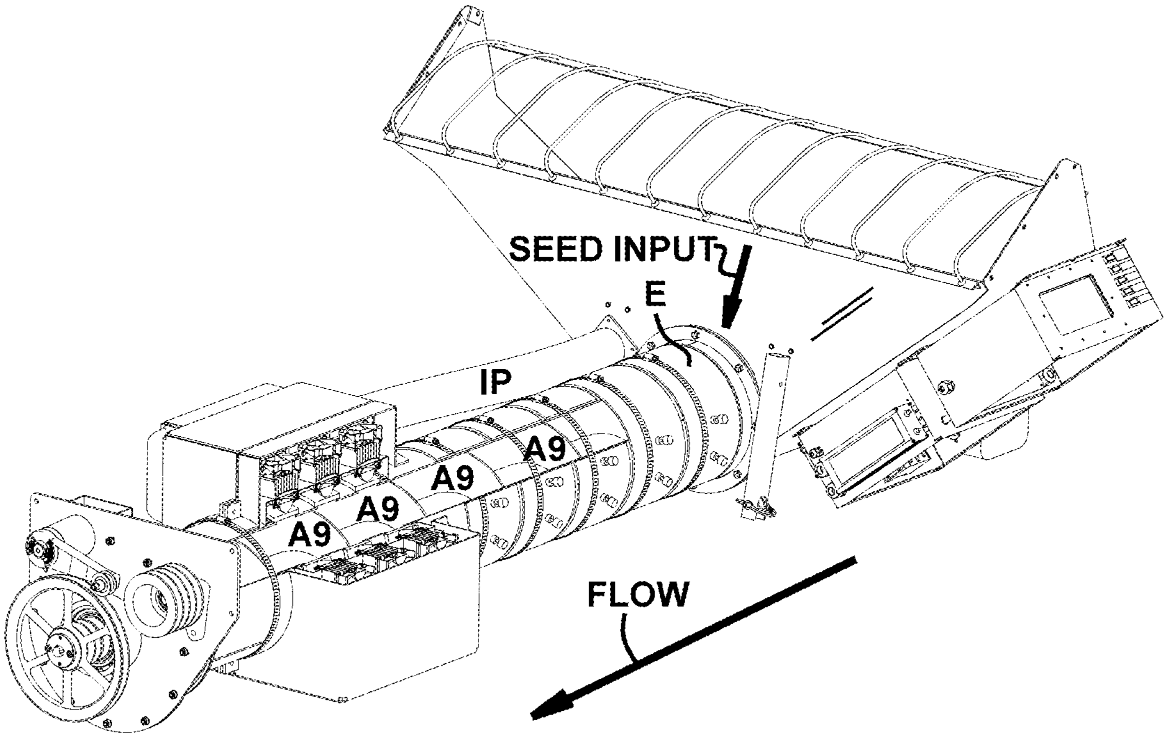
Figure 20:
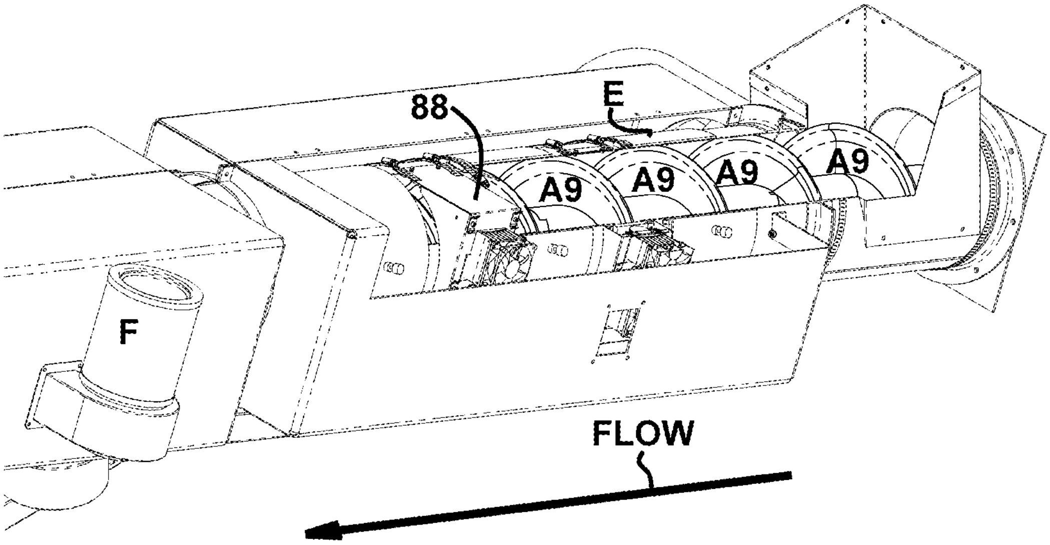
Figure 21:
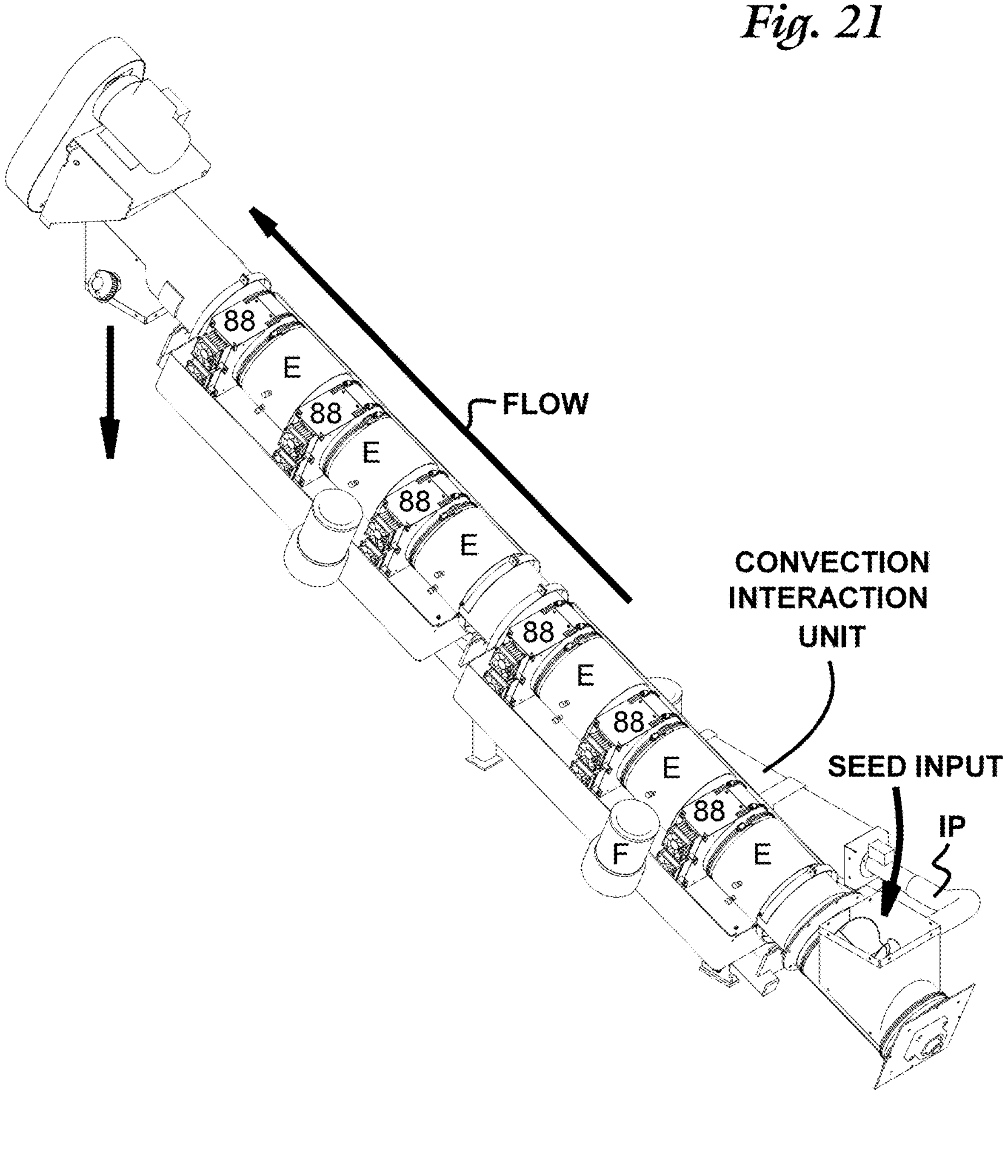

Now referring to FIG. 17, a schematic of the elements of a CONVECTION INTERACTION UNIT with illumination unit 14 are shown. Illumination unit 14 as shown comprises an illuminator IE8 and a processing theater 4 upon which are arrayed harvest Q or tailings which typically can comprise chaff KK and seed or seeds S. Batch transport can be used to position this material for exposure Now referring to FIGS. 18-21 oblique surface views of a tubular seed auger system according to the invention are shown. What is shown is a system built around a 10 inch (25 cm) diameter auger tube. Inside the auger tube is an auger with flighting A9. The auger is driven at 60 RPM using a motor drive as known in th art, and the seed flow rate through the system at a rate of 1 kg/sec int the direction shown (FLOW). As the seeds pass through the system, they are illuminated in the manner previously described and claimed by a series of MWIR emitters E and IRID emitters 88 as shown after exposure to the above-described convection interactions, such as a convection interaction step effectuated upon the seeds in the tailings flow, the convection interaction comprising directing to the seeds in a processing theater inside the auger tube an interactant that is any of hot ozonated air, hot humid air, and hot humidified ozonated air; the hot ozonated air and the hot humidified ozonated air having an average ozone concentration floor of 7 ppm (parts per million) for at least a part of the processing theater. Steam can be provided by known steam generation units used in the steamer and cleaning industries at a flow rate of 2 gallon/hour of input water. Hot air can be provided by known resistive heaters, ozone provided by known ozone generators, all within a CONVECTION INTERACTION UNIT as shown, which is in fluid communication with the processing theater inside the auger tube via interactant port IP. Microwaves can be provided by a known microwave transducer (not shown) inside a portion of the auger tube and driven as claimed. Added humidity is helpful for treating dry seeds with under 12% moisture content. MWIR emitters E comprise heated steel plate, coated on the inside with a known MWIR emitter coating as suggested above. Transit time from seed input to exhaust is approximately 7 seconds.

Tests

In tests on common wheat (*Triticum aestivum*), application of the illumination and convection interaction protocol as taught and claimed produced 0-1% germination rate versus a control at 70% germination rate, using 6 seconds of Medium Wavelength Infrared exposure and 1 second Indigo Region Illumination Distribution exposure at claimed illumination levels, and with preliminary convection interaction that included 300 F hot air, 7 PPM average interpolated ozone, and humidity obtained using applied steam at a rate of 0.6 gallons/hour (2.3 l/hr) water input.

Figure 22:
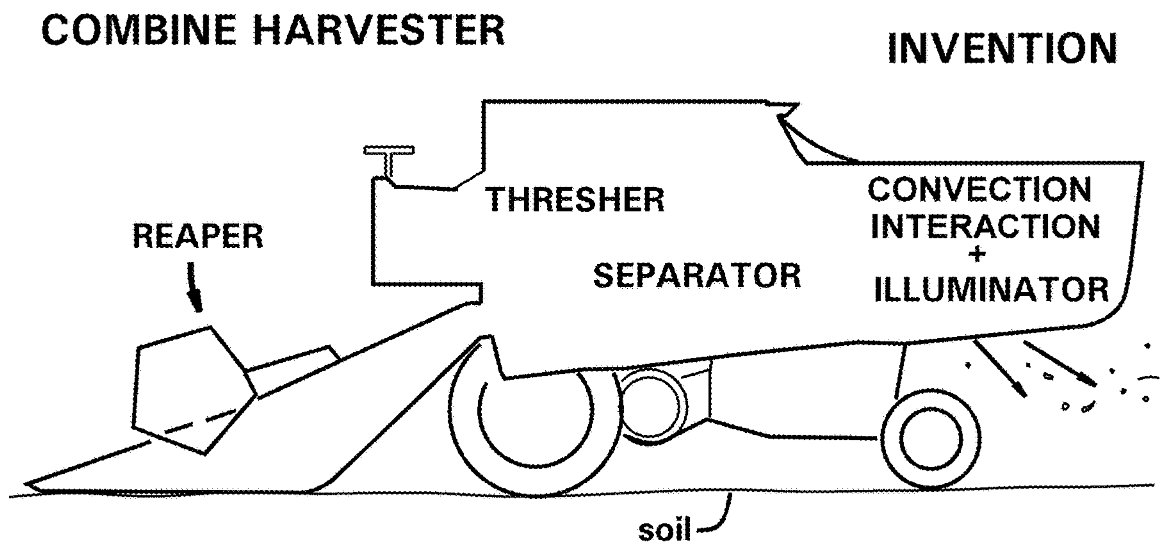
FIG. 22 shows an illustrative schematic silhouette of a combine harvester comprising an illuminator or illumination unit, and a convection interaction unit, shown as functional blocks, according to the invention.
Figure 23:
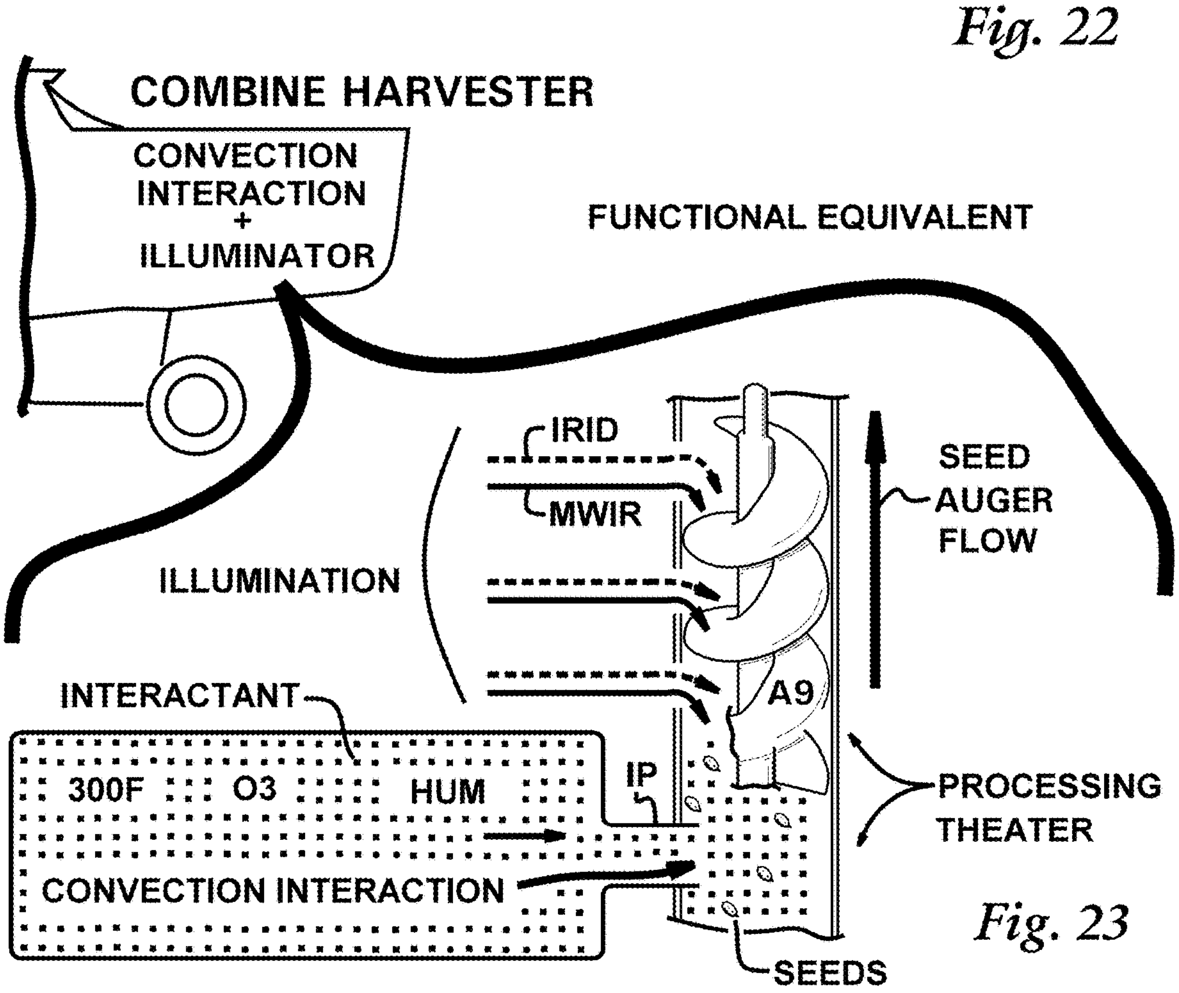
FIG. 23 shows the illustrative schematic silhouette of a combine harvester of FIG. 22 comprising an illuminator or illumination unit, and a convection interaction unit, now shown in detail according to the invention.

Now referring to FIGS. 22 and 23, an illustrative schematic silhouette of a combine is shown with functions of reaping, threshing, and separating, and now additionally comprising both an illumination unit 14, shown as functional block (ILLUMINATOR), and provisions for convection interaction with seeds in transit according to the invention. This system is shown comprising graphically—via an insertion bracket—the system shown in FIG. 9, comprising an illuminator or illumination unit, and a convection interaction unit, shown in detail according to the invention. Interactants (INTERACTANTS) are again fed via an interactant port IP into the seed auger tube comprising a driven auger with flighting A9 as shown.

Figure 24:
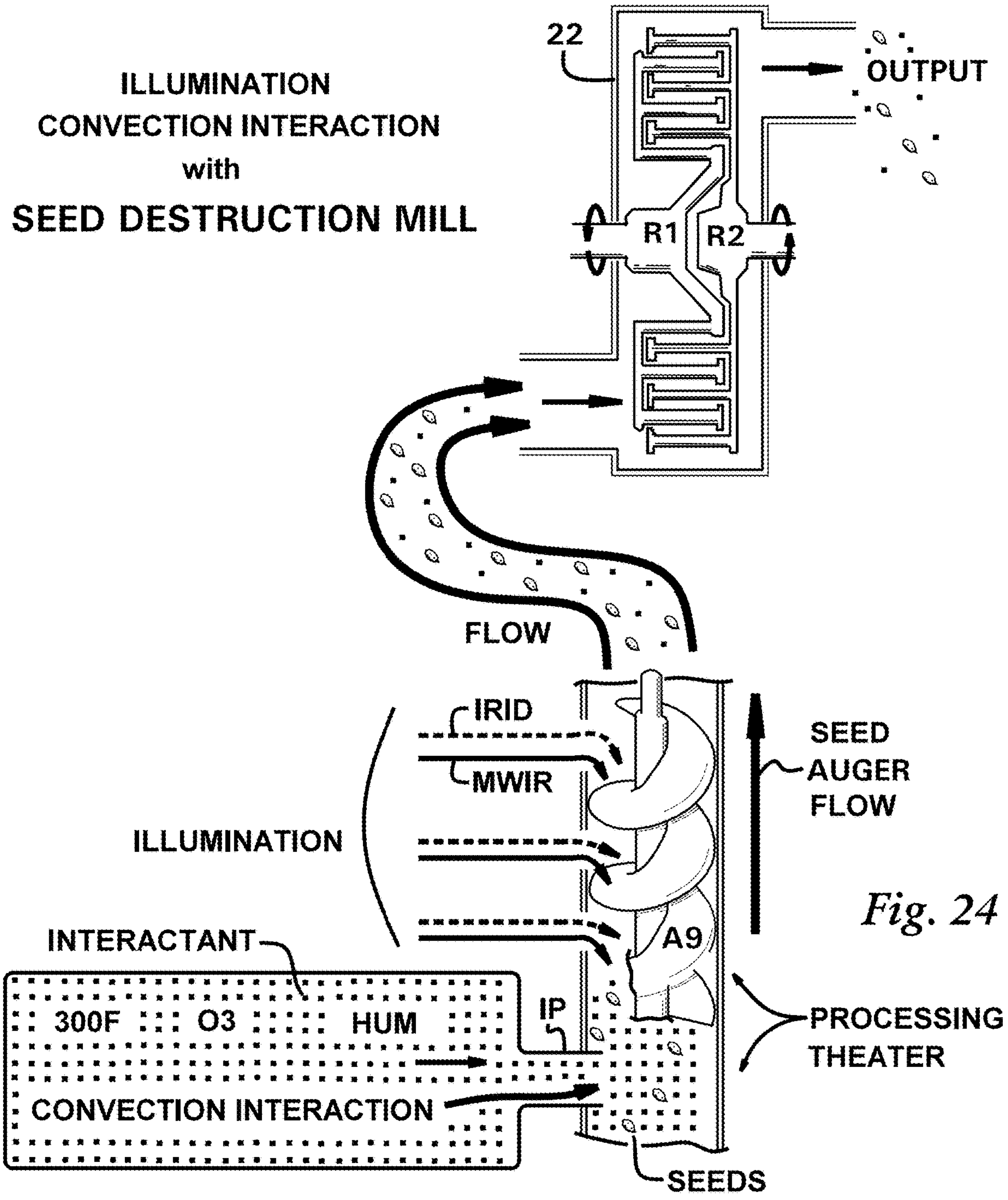
FIG. 24 shows a system invention where the processing theater is an illuminated seed auger tube fed an interactant according to the invention—with output to a seed destruction mill.

Now referring to FIG. 24, a system according to the invention is shown where the processing theater is an illuminated seed auger tube fed an interactant according to the invention—with output to a seed destruction mill. Specifically, the system shown in FIG. 9, comprising an illuminator or illumination unit, and a convection interaction unit, with the seed utput fed as shown to a seed destruction mill. This further enhances reduction of germination viability in a time under one minute.

The prior art seed destruction mill (SEED DESTRUCTION MILL) could be, for example, the Harrington Seed Destructor, alluded to above, disclosed in U.S. Pat. No. 8,152,610 to Harrington; or the seed destruction mill disclosed in U.S. Pat. No. 10,004,176 to Mayerle.

Measurement units were chosen illustratively and in the appended claims include irradiance in W/cm$^2$ but radiance or other similar measures can be used and would by fair conversion read upon the appended claims if equivalent.

For clarity, the invention has been described in structural and functional terms. Those reading the appended claims will appreciate that those skilled in the art can formulate, based on the teachings herein, embodiments not specifically presented here.

Production, whether intentional or not, of irradiance levels that are under the magnitude of powers as given in the appended claims shall not be considered a departure from the claims if a power level as claimed is used at any time during treatment.

The illumination protocol disclosed and claimed can be supplemented with visible light, which can enhance user safety by increasing avoidance and can allow for pupil contraction of the eye of an operator; other radiations can be added with without departing from the appended claims.

The invention, in effecting a change of state to having reduced germination viability of a seed, can be performed on site, such as agricultural field, or remotely at a later time and place.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the optional features mentioned above. Also, nothing as taught and claimed here shall preclude addition of other structures, functional elements, or systems.

Obviously, many modifications and variations of the present invention are possible in light of the above teaching. It is therefore to be understood that, within the scope of the appended claims, the invention may be practiced otherwise than as specifically described or suggested here.

We claim:

1. An enhanced method to induce a change of state of a seeds (S) to having reduced germination viability in a time under one minute, said method comprising:

[1] a convection interaction step effectuated upon said seeds, said convection interaction comprising directing to said seeds in a processing theater an interactant that is any of hot ozonated air, hot humid air, and hot humidified ozonated air; said hot ozonated air and said hot humidified ozonated air having an average ozone concentration floor of 7 ppm (parts per million) inside at least part of said processing theater;

[2] illuminating said seeds in said processing theater to achieve a minimum of 2 $J/cm^2$ cumulative illumination energy, and 0.2 $W/cm^2$ irradiance, but no more than 7 $W/cm^2$ average irradiance, of a light wavelength distribution comprising at least one of an Indigo Region Illumination Distribution (IRID) and infrared radiation that is substantially Medium Wavelength Infrared (MWIR)) radiation;

thereby boosting net efficacity of the enhanced method so as to reduce germination viability further than that obtained via only illuminating said seeds using step [2] alone.

2. The enhanced method of claim 1, wherein the temperature of at least one of said of hot ozonated air, said hot humid air, and said hot humidified ozonated air has an average temperature in a substantial part of said processing theater of any of 140 F-300 F; 301 F-400 F; 401 F-450 F; and 451 F—to a fire temperature limit.

3. The enhanced method of claim 1, wherein said hot humid air and said hot humidified ozonated air flow through at least part of said processing theater and possess in proportion a water content equal to 0.05 percent or greater of a mass of said seeds to be treated.

4. The enhanced method of claim 1, wherein said convection interaction of step [1] also comprises directing ultrasound to said seeds in said processing theater so as to achieve a minimum of 1/10 $J/cm^2$ cumulative energy, and 1/20 $W/cm^2$ applied power density, but no more than 7 $W/cm^2$ applied power density; and possessing an average frequency of 20 kHz-100 kHz.

5. The enhanced method of claim 1, wherein said light wavelength distribution comprises both said Indigo Region Illumination Distribution (IRID) and said infrared radiation that is substantially Medium Wavelength Infrared (MWIR)) radiation.

6. The enhanced method of claim 1, wherein said seeds in said processing theater also pass through a seed destruction mill (SEED DESTRUCTION MILL) so formed, sized, and operated for at least one of fragmentation and damage to a seed.

7. The method of claim 1, wherein said Indigo Region Illumination Distribution includes substantially wavelengths ranging from 400 to 500 nanometers.

8. The method of claim 1, wherein said Medium Wavelength Infrared radiation includes substantially wavelengths ranging from 2 to 8 microns.

9. An illuminated harvester combine enhanced process comprising any of reaping (REAPER), threshing (THRESHER), and separating (SEPARATOR) a harvest to form a tailings flow (TAILINGS) that comprises seeds (S); said enhanced process further comprising

[1] a convection interaction step effectuated upon said seeds in said tailings flow, said convection interaction comprising directing to said seeds in a processing theater an interactant that is any of hot ozonated air, hot humid air, and hot humidified ozonated air; said hot ozonated air and said hot humidified ozonated air having an average ozone concentration floor of 7 ppm (parts per million) for at least a part of said processing theater;

[2] illuminating in said processing theater said seeds in said tailings flow (ILLUMINATOR) to achieve a minimum of 2 $J/cm^2$ cumulative illumination energy, and 0.2 $W/cm^2$ irradiance, but no more than 7 $W/cm^2$ average irradiance, of a light wavelength distribution comprising at least one of an Indigo Region Illumination Distribution (IRID) and infrared radiation that is substantially Medium Wavelength Infrared (MWIR)) radiation;

thereby boosting net efficacity of the enhanced method so as to reduce germination viability of said seeds further than that obtained via only illuminating said seeds using step [2] alone.

10. The enhanced method of claim 9, wherein the temperature of at least one of said of hot ozonated air, said hot humid air, and said hot humidified ozonated air has an average temperature in a substantial part of said processing theater of any of 140 F-300 F; 301 F-400 F; 401 F-450 F; and 451 F—to a fire temperature limit.

11. The enhanced method of claim 9, wherein said hot humid air and said hot humidified ozonated air flow through at least part of said processing theater and possess in proportion a water content equal to 0.05 percent or greater of a mass of said seeds to be treated.

12. The enhanced method of claim 9, wherein said convection interaction of step [1] also comprises directing ultrasound to said seeds in said processing theater so as to achieve a minimum of 1/10 $J/cm^2$ cumulative energy, and 1/20 $W/cm^2$ applied power density, but no more than 7 $W/cm^2$ applied power density; and possessing an average frequency of 20 kHz-100 kHz.

13. The enhanced method of claim 9, wherein said light wavelength distribution comprises both said Indigo Region Illumination Distribution (IRID) and said infrared radiation that is substantially Medium Wavelength Infrared (MWIR)) radiation.

14. The enhanced method of claim 9, wherein said seeds in said processing theater also pass through a seed destruction mill (SEED DESTRUCTION MILL) so formed, sized, and operated for at least one of fragmentation and damage to a seed.

15. The method of claim 9, wherein said Indigo Region Illumination Distribution includes substantially wavelengths ranging from 400 to 500 nanometers.

16. The method of claim 9, wherein said Medium Wavelength Infrared radiation includes substantially wavelengths ranging from 2 to 8 microns.

17. An illuminated harvester combine comprising any of a reaper (REAPER), a thresher (THRESHER), and a separator stage (SEPARATOR), so formed to produce a tailings flow (TAILINGS) comprising seeds (S) passing through a processing theater; and comprising further a convection interaction unit and an illumination unit acting together in said processing theater to perform an enhanced method to induce a change of state of a seeds (S) to having reduced germination viability in a time under one minute, said convection interaction unit and said illumination unit so constructed, supplied, energized, sized, positioned and operated in said processing theater to allow

[1] a convection interaction step effectuated upon said seeds, said convection interaction comprising directing to said seeds in a processing theater an interactant that is any of hot ozonated air, hot humid air, and hot humidified ozonated air; said hot ozonated air and said hot humidified ozonated air having an average ozone concentration floor of 7 ppm (parts per million) for at least a part of said processing theater;

[2] illuminating said seeds in said processing theater to achieve a minimum of 2 $J/cm^2$ cumulative illumination energy, and 0.2 $W/cm^2$ irradiance, but no more than 7 $W/cm^2$ average irradiance, of a light wavelength distribution comprising at least one of an Indigo Region Illumination Distribution (IRID) and infrared radiation that is substantially Medium Wavelength Infrared (MWIR)) radiation;

thereby boosting net efficacity of the enhanced method so as to reduce germination viability further than that obtained via only illuminating said seeds using step [2] alone.

18. The enhanced method of claim 17, wherein the temperature of at least one of said of hot ozonated air, said hot humid air, and said hot humidified ozonated air has an average temperature in a substantial part of said processing theater of any of 140 F-300 F; 301 F-400 F; 401 F-450 F; and 451 F—to a fire temperature limit.

19. The enhanced method of claim 17, wherein said hot humid air and said hot humidified ozonated air flow through at least part of said processing theater and possess in proportion a water content equal to 0.05 percent or greater of a mass of said seeds to be treated.

20. The enhanced method of claim 17, wherein said convection interaction of step [1] also comprises directing ultrasound to said seeds in said processing theater so as to achieve a minimum of 1/10 $J/cm^2$ cumulative energy, and 1/20 $W/cm^2$ applied power density, but no more than 7 $W/cm^2$ applied power density; and possessing an average frequency of 20 kHz-100 kHz.

21. The enhanced method of claim 17, wherein said light wavelength distribution comprises both said Indigo Region Illumination Distribution (IRID) and said infrared radiation that is substantially Medium Wavelength Infrared (MWIR)) radiation.

22. The enhanced method of claim 17, wherein said seeds in said processing theater also pass through a seed destruction mill (SEED DESTRUCTION MILL) so formed, sized, and operated for at least one of fragmentation and damage to a seed.

23. The method of claim 17, wherein said Indigo Region Illumination Distribution includes substantially wavelengths ranging from 400 to 500 nanometers.

24. The method of claim 17, wherein said Medium Wavelength Infrared radiation includes substantially wavelengths ranging from 2 to 8 microns.

25. A harvest (Q) comprising seeds (S) having been subjected to an enhanced method to induce a change of state of the seeds to having reduced germination viability in a time under one minute, said enhanced method comprising:

[1] a convection interaction step effectuated upon said seeds, said convection interaction comprising directing to said seeds in a processing theater an interactant that is any of hot ozonated air, hot humid air, and hot humidified ozonated air; said hot ozonated air and said hot humidified ozonated air having an average ozone concentration floor of 7 ppm (parts per million) for at least a part of said processing theater;

[2] illuminating said seeds in said processing theater to achieve a minimum of 2 $J/cm^2$ cumulative illumination energy, and 0.2 $W/cm^2$ irradiance, but no more than 7 $W/cm^2$ average irradiance, of a light wavelength distribution comprising at least one of an Indigo Region Illumination Distribution (IRID) and infrared radiation that is substantially Medium Wavelength Infrared (MWIR)) radiation;

thereby boosting net efficacity of the enhanced method so as to reduce germination viability further than that obtained via only illuminating said seed using step [2] alone.

* * * * *